United States Patent [19]

Nakajima

[11] Patent Number: 5,721,887
[45] Date of Patent: Feb. 24, 1998

[54] MICROCOMPUTER INCLUDING A CIRCUIT FOR GENERATING A RESET SIGNAL WHEN THE SUPPLY VOLTAGE IS BELOW A THRESHOLD LEVEL

[75] Inventor: Toyokatsu Nakajima, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 498,814

[22] Filed: Jul. 6, 1995

[30] Foreign Application Priority Data

Jul. 12, 1994 [JP] Japan .................... 6-160170

[51] Int. Cl.⁶ .................................... G06F 1/24
[52] U.S. Cl. .................... 395/555; 395/560; 395/750
[58] Field of Search .................... 395/750, 555, 395/559, 560

[56] References Cited

U.S. PATENT DOCUMENTS

| | | | |
|---|---|---|---|
| 4,464,584 | 8/1984 | Hentzschel et al. | 307/200 |
| 4,701,856 | 10/1987 | DiGiulio et al. | 364/466 |
| 5,400,341 | 3/1995 | Makino et al. | 371/12 |
| 5,454,114 | 9/1995 | Yach et al. | 395/750 |
| 5,539,910 | 7/1996 | Brueckmann et al. | 395/750 |

*Primary Examiner*—Dennis M. Butler
*Attorney, Agent, or Firm*—Lowe, Price, LeBlanc & Becker

[57] ABSTRACT

A microcomputer in which a voltage drop in a power source is detected by a voltage detecting circuit, and a capacitor is connected to a first power source and/or a second power source on the basis of a detection signal of said detecting circuit thereby to be charged/discharged, so that a reset signal is generated. The supply of a clock signal is controlled on the basis of said detection signal. When a source voltage of the microcomputer is found to be lower than a reference voltage but recovering in a short time, it is possible to resume a programmed operation from a temporary cut-off state without initializing the program.

28 Claims, 20 Drawing Sheets

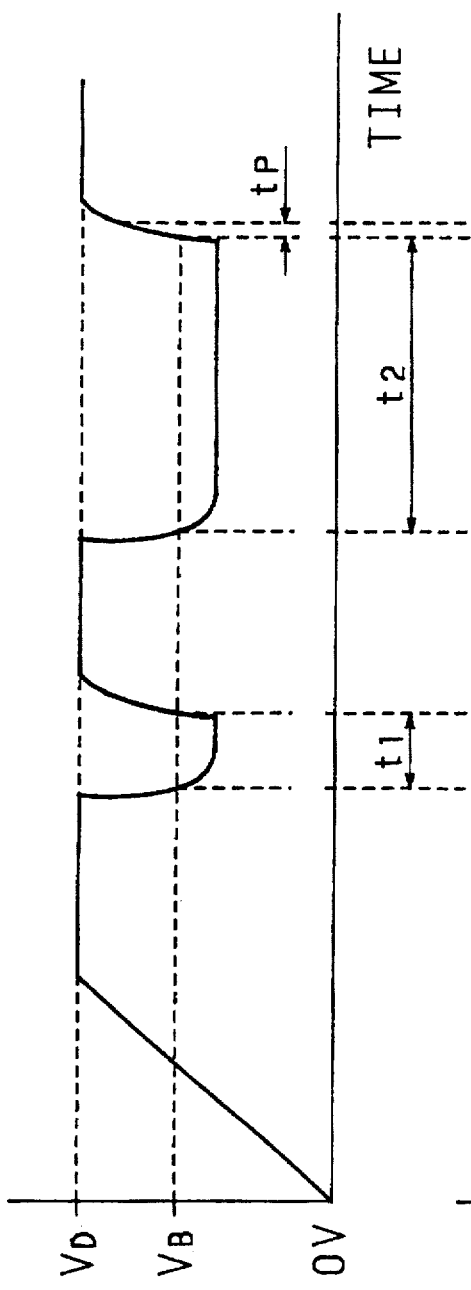
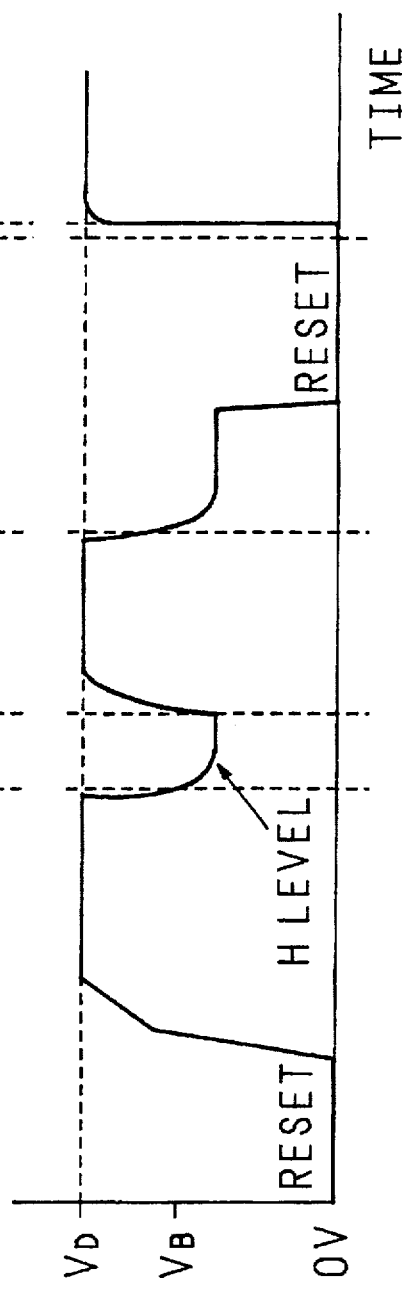
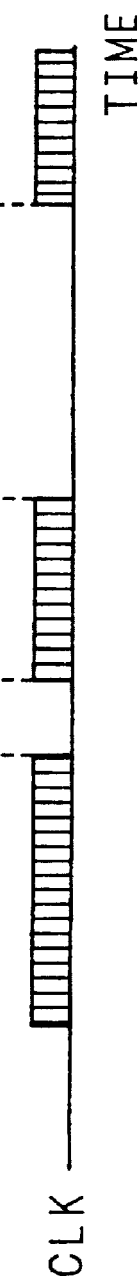
FIG. 6a SOURCE VOLTAGE V_A (V)
FIG. 6b TERMINAL VOLTAGE V_C (V)
FIG. 6c CLK

5,721,887

1

MICROCOMPUTER INCLUDING A CIRCUIT FOR GENERATING A RESET SIGNAL WHEN THE SUPPLY VOLTAGE IS BELOW A THRESHOLD LEVEL

BACKGROUND OF THE INVENTION

1. Field of the Invention

The present invention relates to a microcomputer which is not reset every time a power source is cut off instantaneously.

2. Description of Related Art

In recent years, portable electric appliances and gadgets such as headphone stereos and portable telephones operated by built-in batteries have been widely spread. Since a user uses such a portable device while carrying the same, the device may be possibly applied with strong vibrations and shocks, whereby an imperfect contact may be caused between the batteries and battery connecting terminals to cut off a power source for a microcomputer incorporated in the portable electric device.

FIG. 1 is a graph showing a change of a power source voltage of the microcomputer when the power source is cut off instantaneously. In the graph, an axis of ordinate designates the source voltage and an axis of abscissa designates time. When the source is cut off at a time point $t_0$ instantaneously, the source voltage of the microcomputer is started to be lowered from the time point. When the instantaneous cut-off of the power source is dissolved at a time point $t_1$, the power source recovers immediately at the time point $t_1$ to the voltage before the cut-off is generated. At this time, when the power source is lowered to a minimum operating voltage $V_{MIN}$ of the microcomputer or smaller, a programmed operation of the microcomputer runs out of control.

In general, since a filter obtained by combining a capacitor and a resistance is connected to a power circuit of the microcomputer, the source voltage of the microcomputer is so adapted as not to be not larger than the minimum operating voltage $V_{MIN}$ of the microcomputer in a little time even when the power source is cut off instantaneously. However, when the voltage drop exceeds allowances of the filter, the source voltage of the microcomputer is decreased to the minimum operating voltage $V_{MIN}$ or smaller, and there is a possibility that the programmed operation may run away. In order to avoid the runaway of the programmed operation, a watchdog timer is built in so as to detect the runaway of the programmed operation of the microcomputer.

FIG. 2 is a block diagram showing an example of a conventional microcomputer of the aforementioned type. In a microcomputer 1, a voltage detecting circuit 1a, a CPU 1b and a peripheral module 1c of a RAM, ROM and the like are incorporated. A source terminal 1d of the microcomputer 1 is connected to the voltage detecting circuit 1a. To the CPU 1b and the peripheral module 1c is inputted a clock signal CLK for driving the CPU 1b and module 1c. When the voltage detecting circuit 1a detects the source voltage drop, it outputs a reset signal RST to reset terminals of the CPU 1 and the peripheral module 1c. When the reset signal RST is inputted, the supply of the clock signal CLK is stopped to stop the operations of the CPU 1b and the peripheral module 1c. Further, the CPU 1b and the peripheral module 1c are reset by the reset signal RST into the initial state. Accordingly, an erroneous operation by the microcomputer 1 due to the source voltage drop is prevented.

However, in the conventional microcomputer, as mentioned hereinabove, every time the voltage detecting circuit detects the source voltage drop, not only the programmed operations of the CPU and peripheral module are stopped, but the CPU and the peripheral module are reset. Therefore, it is inconvenient for the CPU and peripheral module to resume the programmed operations again from the initial state when the source voltage is recovered.

SUMMARY OF THE INVENTION

The present invention has been devised in order to solve the aforementioned problem, and the object thereof is to provide a microcomputer capable of resuming a programmed operation from a temporarily interrupted state without initializing the program when a source voltage becomes lower than a reference voltage and then recovered in a short time.

The microcomputer according to the invention is provided with a first resistance connected to a first power source, a second resistance connected to a second power source, a selecting circuit for selecting the first resistance and the second resistance alternatively and a capacitor to which the resistance selected by the selecting circuit is connected. When the voltage detecting circuit detects a voltage drop of the first power source, the supply of a clock signal is shut in response to a detection signal. At the same time, the selecting circuit selects the second resistance, so that the second power source and the capacitor are connected to each other through the second resistance. The capacitor is let to discharge with a time constant of the second resistance and capacitor, and when the discharging is finished, a reset signal is generated thereby to reset the programmed operation. When the voltage detecting circuit detects that the voltage of the first power source is recovered, the supply of the clock signal is started again by the detection signal. The selecting circuit selects the first resistance, and the first power source is connected to the capacitor through the first resistance. The capacitor is charged with a time constant of the first resistance and capacitor. When the charging is finished, the reset signal is not generated and the resetting of the programmed operation is canceled. Accordingly, when a time period of the voltage drop resulting from the instantaneous interruption of the first power source is shorter than the time constant determined by the second resistance and capacitor, the supply of clock signals is stopped to stop the programmed operation, thereby preventing an erroneous operation. On the other hand, when a time period while the source voltage is lowered is longer than the time constant, the supply of clock signals is stopped to stop the programmed operation and moreover the reset signal is generated to reset the programmed operation so that the programmed operation is executed from the initial state, when the voltage of the first power source is recovered. The program is thus prevented from being erroneously conducted. In this way, since a delay time is insured from the instantaneous cut-off of the power source to the resetting of the programmed operation, the programmed operation is never reset every time the first power source is cut off instantaneously.

In the aforementioned microcomputer, in the case where the first power source is connected to the selecting circuit without the first resistance interposed, the reset signal comes immediately not to be generated, with the time constant not applied, when the voltage of the first power source is recovered.

When a switching circuit is interposed in place of the selecting circuit between the capacitor and the first resistance, the capacitor is charged with a voltage obtained by dividing the voltage of the first power source by the first resistance and second resistance. In this configuration, since no circuits are interposed between the capacitor and second resistance, the capacitor is discharged without being adversely influenced by an on-resistance of a circuit interposed in the midway. Accordingly, even when the voltage of the first power source is decreased suddenly, the discharging of the capacitor is surely carried out.

The above and further objects and features of the invention will more fully be apparent from the following detailed description with accompanying drawings.

BRIEF DESCRIPTION OF THE DRAWINGS

FIG. 6 is a waveform diagram of each voltage and a clock signal when power source is instantaneously cut off;

DESCRIPTION OF THE PREFERRED EMBODIMENTS

The following description will be made on the invention with reference to the drawings showing the embodiments thereof.

Embodiment 1

Figure 1:
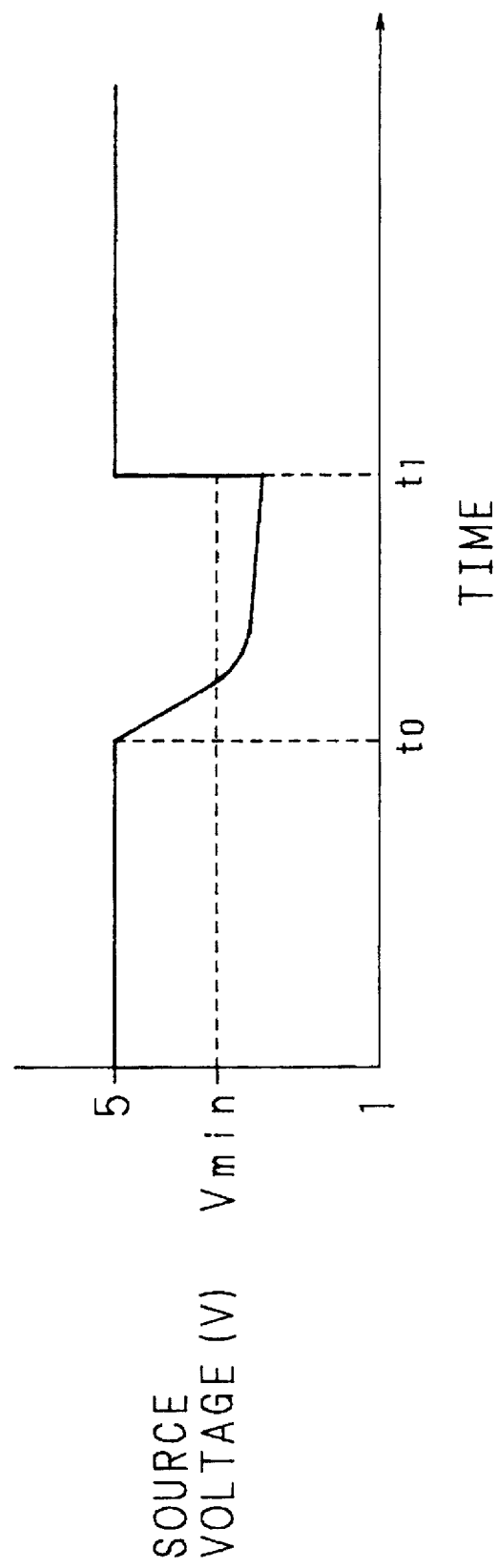
FIG. 1 is a waveform diagram showing a drop of a power source voltage.
Figure 2:
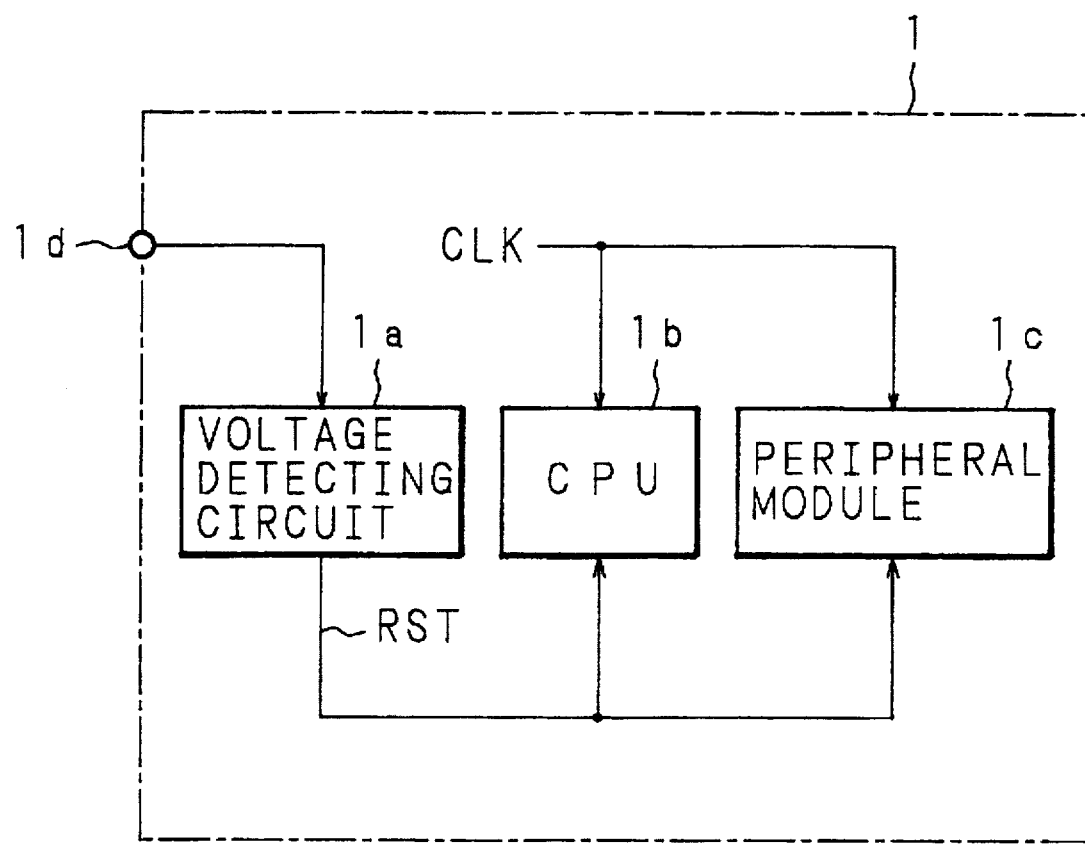
FIG. 2 is a configuration diagram of a conventional microcomputer.
Figure 3:
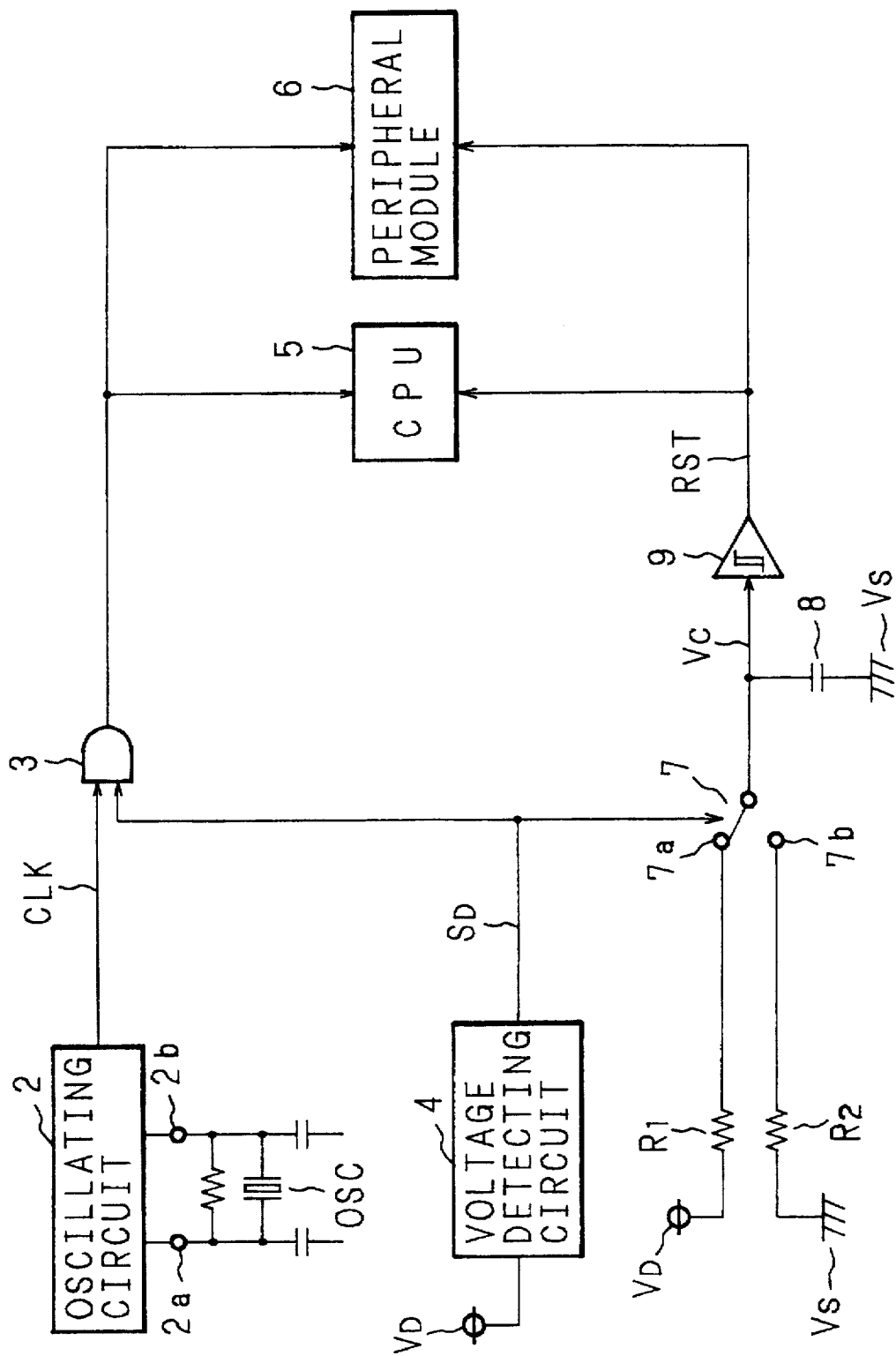
FIG. 3 is a block diagram showing a configuration of a first embodiment of a microcomputer according to the present invention.

FIG. 3 is a block diagram showing a configuration of a first embodiment of a microcomputer according to the invention. The clock signal CLK outputted from an oscillating circuit 2 connected to an oscillator OSC via oscillator connecting terminals 2a, 2b is inputted to one input terminal of an AND circuit 3. A voltage drop detection signal $S_D$ which is a detecting output from a voltage detecting circuit 4 when detecting a decrease of a voltage of a power source $V_D$ is inputted to the other input terminal of the AND circuit 3, and is also inputted to a selecting circuit 7 as a switching signal. The clock signal CLK outputted from the AND circuit 3 is supplied to a CPU 5 and a peripheral module 6 consisting of a RAM, ROM or digital/analog converter and the like.

The voltage of the power source $V_D$ is given to one terminal 7a of the selecting circuit 7 through a resistance $R_1$, and a voltage of a ground source $V_S$ is fed to the other terminal 7b of the selecting circuit 7 through a resistance $R_2$. The selecting circuit 7 selects the resistance $R_1$ or resistance $R_2$, that is, the one terminal 7a or the other terminal 7b on the basis of the switching signal. Then, the selected voltage is sent to a capacitor 8 having one terminal grounded and to a Schmitt circuit 9. A reset signal RST outputted by the Schmitt circuit 9 is inputted to reset terminals of the CPU 5 and peripheral module 6.

Figure 4:
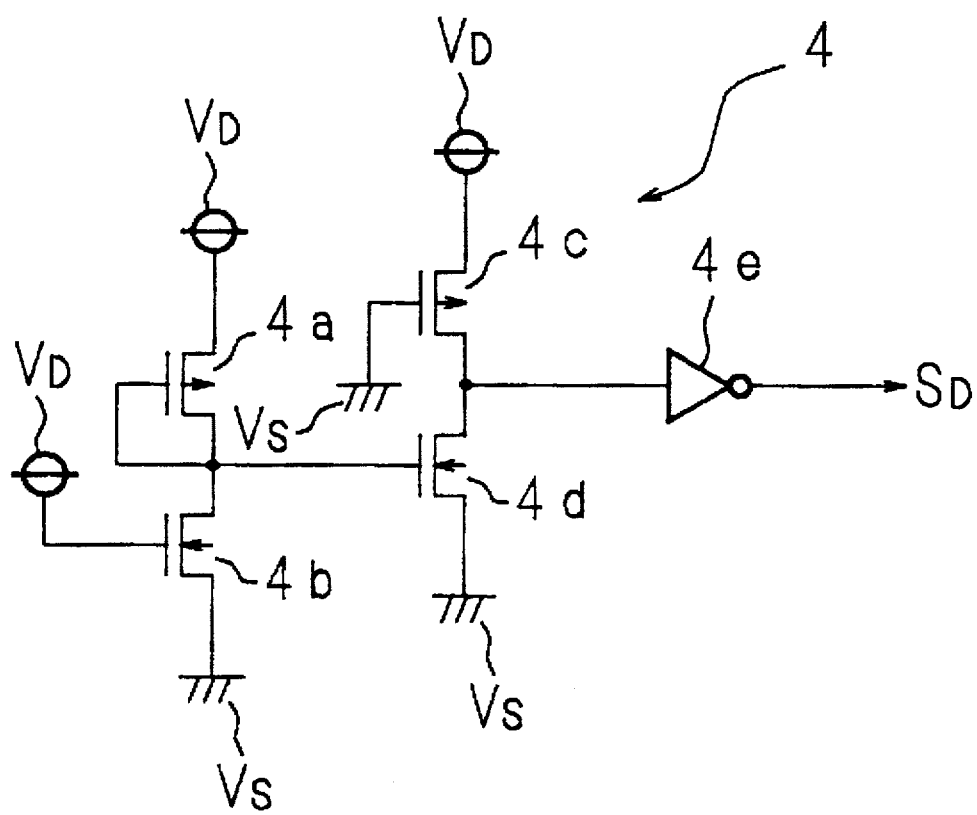
FIG. 4 block diagram showing a configuration of a voltage detecting circuit.

FIG. 4 is a block diagram showing an example of a configuration of the voltage detecting circuit 4. Between the power source $V_D$ and the ground source $V_S$, a series circuit of a P-channel transistor 4a and an N-channel transistor 4b is interposed. To a gate of the N-channel transistor 4b, the voltage of the power source $V_D$ is inputted so as to act as a resistance load. A gate of the P-channel transistor 4a is connected to a connecting point of the P-channel transistor 4a and the N-channel transistor 4b.

Also between the power source $V_D$ and the ground source $V_S$, a series circuit of a P-channel transistor 4c and an N-channel transistor 4d is provided and a gate of the P-channel transistor 4c is grounded so as to function as a resistance load. To a gate of the N-channel transistor 4d is inputted an electric potential of the connecting point of the P-channel transistor 4a and N-channel transistor 4b. An electric potential of a connecting point of the P-channel transistor 4c and N-channel transistor 4d is inputted to an inverter 4e which outputs the voltage drop detection signal $S_D$.

In the voltage detecting circuit 4 configured as above, a voltage $(V_D-V_{tp})$ obtained by subtracting a threshold voltage $V_{tp}$ of the P-channel transistor 4a from the voltage of the power source $V_D$ is outputted to the gate of the N-channel transistor 4d from the connecting point of the P-channel transistor 4a and N-channel transistor 4b. When this output voltage $(V_D-V_{tp})$ is larger than a threshold voltage $V_{tn}$ of the N-channel transistor 4d, the N-channel transistor 4d is turned on and a potential of L level is supplied to the inverter 4e. That is, when the voltage of the power source $V_D$ is larger than $V_{tp}+V_{tn}$, the potential of L level is outputted, and a potential of the voltage drop detection signal $S_D$ inverted by the inverter 4e becomes an H level. When the voltage of the power source $V_D$ is lowered to not larger than a predetermined voltage, the N-channel transistor 4d is turned off, and the voltage drop detection signal $S_D$ outputted from the inverter 4e becomes the L level.

Figure 5:
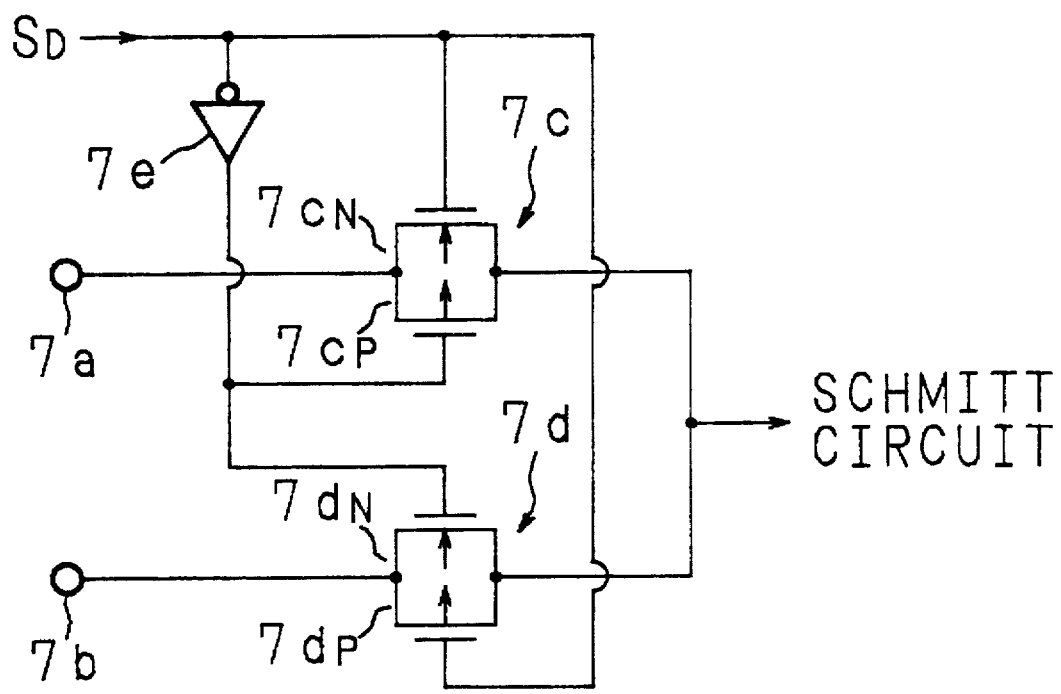
FIG. 5 is a block diagram showing a configuration of a selecting circuit.

FIG. 5 is a block diagram showing a configuration of the selecting circuit 7. The voltage inputted to the one terminal 7a of the selecting circuit 7 is inputted to an input terminal of a transfer gate 7c consisting of an N-channel transistor $7c_N$ and a P-channel transistor $7c_P$. The voltage inputted to the other terminal $7b$ of the selecting circuit 7 is inputted to an input terminal of a transfer gate $7d$ consisting of an N-channel transistor $7d_N$ and a P-channel transistor $7d_P$. Output voltages from the transfer gates $7c$ and $7d$ are sent in common to an input terminal of the Schmitt circuit 9 (refer to FIG. 3). The voltage drop detection signal $S_D$ outputted by the voltage detecting circuit 4 is directly inputted to gates of the N-channel transistor $7c_N$ and P-channel transistor $7d_P$, and to gates of the P-channel transistor $7c_P$ and N-channel transistor $7d_N$ through an inverter $7e$.

In the selecting circuit 7, when the voltage detection signal $S_D$ of the H level is inputted from the voltage detecting circuit 4, the transfer gate $7c$ is turned on and the voltage inputted to the one terminal $7a$ is selected to be outputted. When the voltage drop detection signal $S_D$ of the L level is inputted, the transfer gate $7d$ is turned on and the voltage inputted to the other side terminal $7b$ is selected and outputted.

Next, explanation will be made on the operation of the microcomputer configured as described above. When the voltage of the power source $V_D$ is supplied to the microcomputer, the oscillating circuit 2 starts to oscillate and the clock signal CLK oscillated by the oscillating circuit 2 is outputted to the one input terminal of the AND circuit 3. When the voltage of the power source $V_D$ is not smaller than the predetermined voltage, the voltage drop detection signal $S_D$ of the H level is outputted from the voltage detecting circuit 4. In consequence, a logic of the AND circuit 3 is held and the clock signal CLK is outputted from the AND circuit 3 to be supplied to the CPU 5 and peripheral module 6, whereby the CPU 5 and peripheral module 6 are driven.

The selecting circuit 7 selects the voltage at the one terminal $7a$ connected to the resistance $R_1$ in accordance with the voltage drop detection signal $S_D$ of the H level, whereby the capacitor 8 is charged by the voltage of the power source $V_D$ through the resistance $R_1$. As a result, a voltage $V_C$ of the capacitor is inputted to the Schmitt circuit 9, and the reset signal RST of the H level in an inactive state is outputted from the Schmitt circuit 9. The reset signal RST is inputted to the reset terminals of the CPU 5 and peripheral module 6. The CPU 5 and peripheral module 6 are turned to be freed from a reset state and perform a predetermined programmed operation.

On the other hand, when the potential of the voltage drop detection signal $S_D$ is inverted to L level, the selecting circuit 7 selects the voltage of the other terminal $7b$ connected to the resistance $R_2$. The capacitor 8 discharges through the resistance $R_2$ and the terminal voltage $V_C$ of the capacitor 8 starts to be decreased. The discharging at this time is completed by a delay circuit consisting of the resistance $R_2$ and capacitor 8 after a delay time $t_d$ determined by a product of the resistance $R_2$ and capacitor 8 has passed. Then, the input side of the Schmitt circuit 9 is turned to the L level, and the reset signal RST of the L level in an active state is outputted from the Schmitt circuit 9.

FIG. 6 is a waveform diagram of the source voltage, the terminal voltage $V_C$ of the capacitor 8 and the clock signal at the time when the power source is instantaneously cut off. When a voltage $V_A$ of the power source $V_D$ is lowered to be not larger than a reference voltage $V_B$ in a period $t_1$ because of an instantaneous cut-off of the power source of the microcomputer due to vibrations, shock, and so on of a portable electric device during the use, the potential of the voltage drop detection signal $S_D$ outputted from the voltage detecting circuit 4 is inverted from the H level to 1 level. The logic of the AND circuit 3 is not satisfied and the supply of the clock signal CLK from the AND circuit 3 to the CPU 5 and peripheral module 6 is stopped, whereby the operations of the CPU 5 and the peripheral module 6 are stopped.

When the period $t_1$ is shorter than the delay time $t_d$, the terminal voltage $V_C$ of the capacitor S is larger than a threshold voltage at an H side (positive side) of the Schmitt circuit 9, with the reset signal RST held in the H level, so that the CPU 5 and peripheral module 6 are not reset. Thereafter, when the voltage $V_A$ of the power source $V_D$ is recovered to be not smaller than the reference voltage $V_B$, the supply of the clock signal CLK is resumed.

In the case where the power source $V_D$ is cut off instantaneously for a period t2 which is longer than the delay time $t_d$, similar to the case of the period $t_1$, when the voltage $V_A$ of the power source $V_D$ is not larger than the reference voltage $V_B$, the voltage drop detection signal $S_D$ of the L level is outputted from the voltage detecting circuit 4 and the clock signal CLK is stopped to be supplied from the AND circuit 3. As the voltage of the other terminal $7b$ is selected by the selecting circuit 7 upon receipt of the signal $S_D$ of the L level, the terminal voltage $V_C$ of the capacitor 8 starts to be lowered, so that the input side of the Schmitt circuit 9 approaches the L level. When a time period in which the voltage $V_A$ is lower than the reference voltage $V_B$ or smaller reaches the delay time $t_d$, since the discharging is finished and the voltage of the Schmitt circuit 9 at the input side (terminal voltage $V_C$) becomes the L level, the reset signal RST of the L level is outputted from the Schmitt circuit 9. The CPU 5 and peripheral module 6 are consequently reset.

Subsequently, when the instantaneous cut off-of the power source $V_D$ is dissolved and the voltage of the power source $V_D$ is recovered to be not smaller than the reference voltage $V_B$, the voltage drop detection signal $S_D$ is inverted to the H level, and from that time point, the supply of the clock signal CLK from the AND circuit 3 is resumed. Since the voltage drop detection signal $S_D$ becomes the H level, the voltage of the one side terminal $7a$ is selected by the selecting circuit 7 and the capacitor 8 is charged with the voltage of the power source $V_D$ through the resistance $R_1$. After the delay time $t_p$ obtained by the product of the resistance $R_1$ and the capacitor 8 has elapsed, the reset signal RST outputted by the Schmitt circuit 9 becomes the H level to cancel resetting of the CPU 5 and peripheral module 6, so that the microcomputer starts the programmed operation again.

In the manner as above, when the instantaneous cut-off of the power source $V_P$ continues for a short time, only the supply of the clock signal CLK is stopped and the CPU 5 and peripheral module 6 are not reset. In contrast, when the instantaneous cut-off continues long, after the supply of the clock signal CLK is stopped, the CPU 5 and peripheral module 6 are reset while the capacitor 8 is let to discharge, so that the runaway of the programmed operation is prevented.

Figure 7:
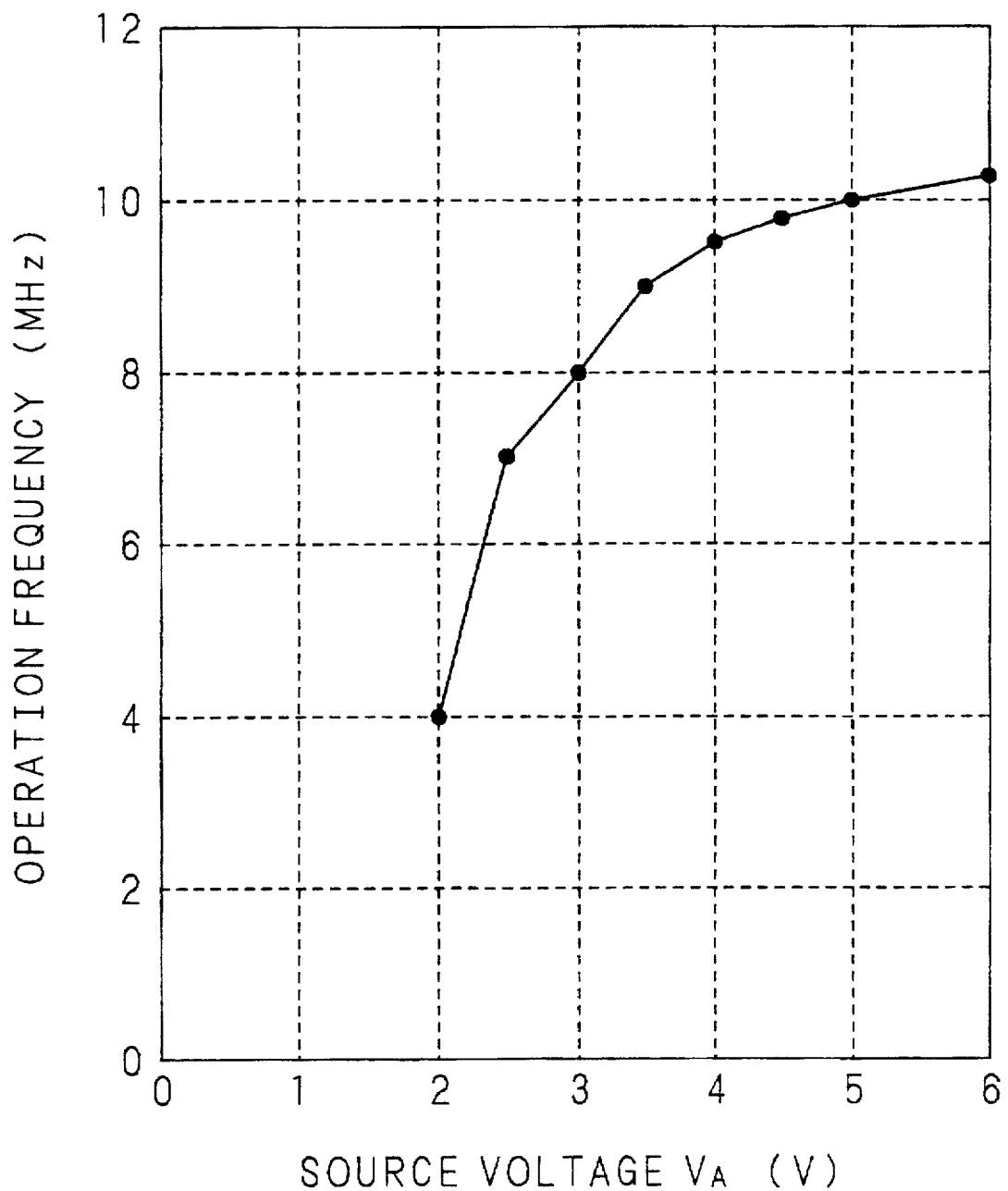
FIG. 7 is a graph showing a relationship between the power source voltage and an operation frequency.

Generally, a microcomputer has a characteristic as shown in FIG. 7 to a change of the voltage of the power source $V_D$. According to a conventional configuration, when the voltage $V_A$ of the power source $V_D$ is decreased, an operation frequency is lowered and the operation of the CPU 5 and peripheral module 6 is slowed, although the clock signal CLK of a constant frequency attained by a quartz oscillator or a ceramic oscillator is supplied from the oscillating circuit 2 in spite of the decrease of the voltage $V_A$. For example, in the case where the microcomputer is driven by the clock signal CLK of 8 MHz, when the voltage $V_A$ of the power source $V_D$ becomes not larger than 3V, it exceeds the operation limit of the microcomputer to induce an erroneous operation of the microcomputer or runaway of the programmed operation.

On the contrary, according to the invention, when the microcomputer having the characteristic shown in FIG. 7 is operated by the clock signal of 8 MHz and the voltage $V_A$ of the power source $V_D$ is set to be, for example, 5V, supposing that the reference voltage $V_B$ is an intermediate value of not smaller than 3V and not larger than 5V, e.g., 3.5V, and when the power source $V_D$ is cut off instantaneously to show the voltage $V_A$ of not larger than 3.5V, the voltage drop detection signal $S_D$ is outputted from the voltage detecting circuit 4 to stop the supply of the clock signal CLK. Since the operation frequency is 0 $H_Z$ when the clock signal CLK is stopped, it produces the highest allowance for the microcomputer, preventing the microcomputer from erroneously operating or the programmed operation from being out of control even if the voltage $V_A$ of the power source $V_D$ is decreased, for instance, to approximately 2V. When the voltage $V_A$ of the power source $V_D$ is returned to not smaller than 3.5V again and the voltage drop detection signal $S_D$ of the voltage detecting circuit 4 becomes the H level, the clock signal CLK is started to be supplied again and the microcomputer resumes the operation. In this way, when the time period of the instantaneous cut-off of the voltage is short, the supply of the clock signal CLK of the microcomputer is stopped temporarily so that the erroneous operation of the microcomputer or runaway of the programmed operation is prevented.

Next, the operation when the power source $V_D$ is turned on will be discussed below. When the power source $V_D$ is ON, since the capacitor 8 is not charged, the voltage of the input side of the Schmitt circuit 9 is 0V (L level). The voltage drop detection signal $S_D$ outputted by the voltage detecting circuit 4 is in the L level and the voltage of the other side terminal 7b is selected by the selecting circuit 7. Therefore, the microcomputer is reset while the reset signal RST is in the L level of the active state. In consequence, the voltage of the power source $V_D$ increases to be not smaller than the reference voltage $V_B$, the potential of the voltage drop detection signal $S_D$ becomes the H level, and the clock signal CLK is outputted from the AND circuit 3 and fed to the CPU 5 and peripheral module 6.

Then, the delay time $t_p$ as the product of the resistance $R_1$ and capacitor 8 later, the capacitor 8 is completely charged and the terminal voltage $V_C$ thereof becomes the H level to invert the reset signal RST to the H level, when the resetting of the microcomputer is canceled, to start the programmed operation.

In the manner as above, when the power source is turned on, the microcomputer is reset automatically. When the power source is cut off instantaneously during the programmed operation by the microcomputer, the supply of the clock signal is stopped thereby to stop the operation of the microcomputer, thus preventing the erroneous operation. Moreover, when the instantaneous cut-off continues further longer to cause the stored content in the peripheral module to disappear, the microcomputer can be reset so that the programmed operation is resumed from the initial state.

Although, the resistance $R_1$ is not necessarily required, it is used for the purpose of maintaining a pulse width for the reset signal RST to be in the L level for not smaller than a predetermined time. This is because of the reason that, when a reset pulse width is too short, the microcomputer is not normally reset depending on the kind thereof. As shown in FIG. 3, when the resistance $R_1$ is used, the period, since the voltage drop detection signal $S_D$ is inverted to the H level until the reset signal RST is inverted to the H level can be selected by a value of the resistance $R_1$. Therefore, even when the voltage $V_A$ is recovered immediately after the reset signal RST becomes the L level and the voltage drop detection signal $S_D$ is inverted to the H level, a predetermined reset pulse width can be ensured to surely reset the CPU 5 and the peripheral module 6.

Figure 8:
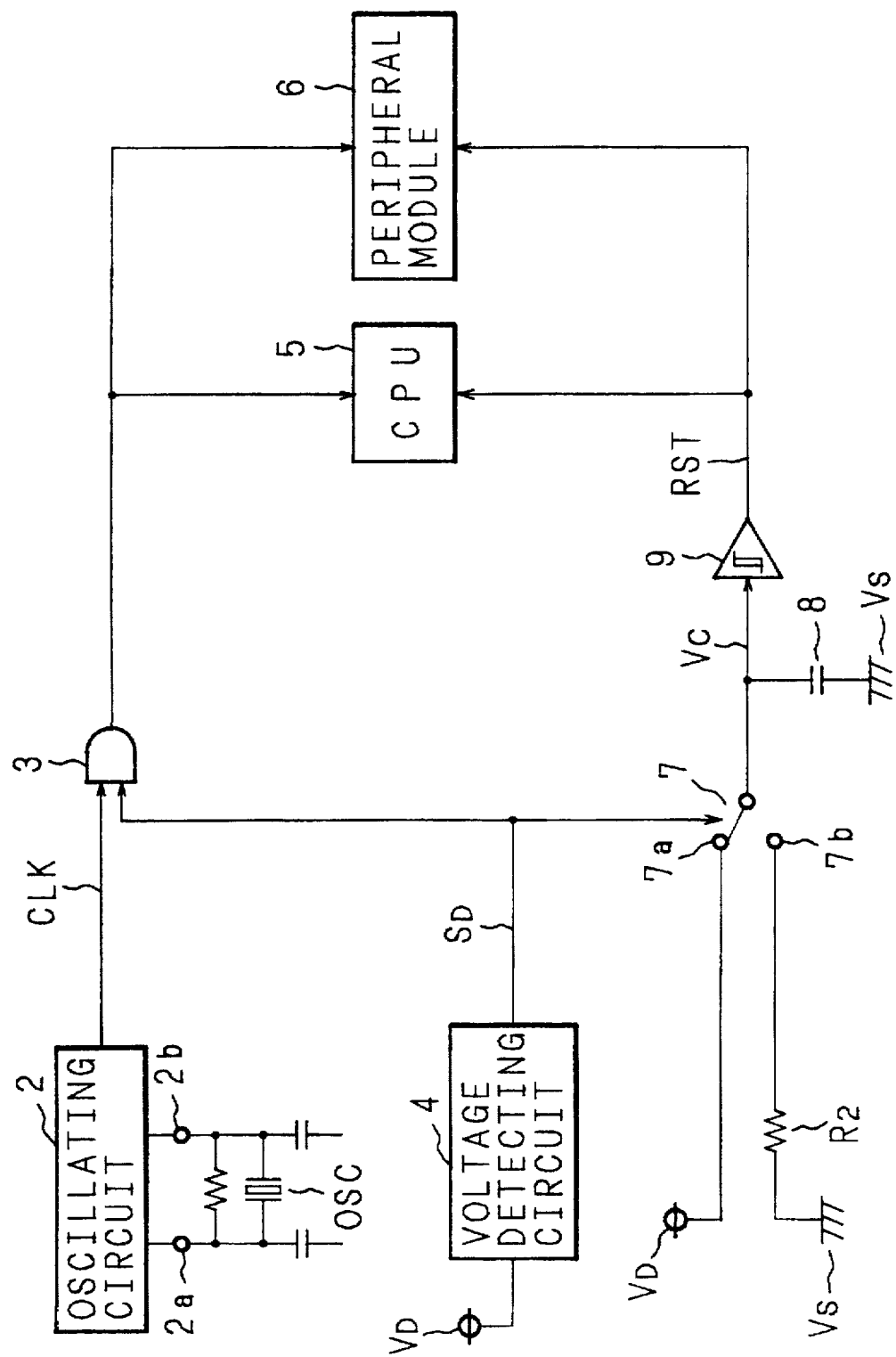
FIG. 8 is a block diagram showing a modified example of the first embodiment.

Without the resistance $R_1$ connected (FIG. 8), when the selecting circuit V selects the one terminal 7a, the capacitor 8 is directly connected with the power source $V_D$ and immediately charged, so that the reset signal RST is inverted to the H level. Accordingly, the presence/absence of the resistance $R_1$ may be determined depending on the kind of the microcomputer.

Embodiment 2

Figure 9:
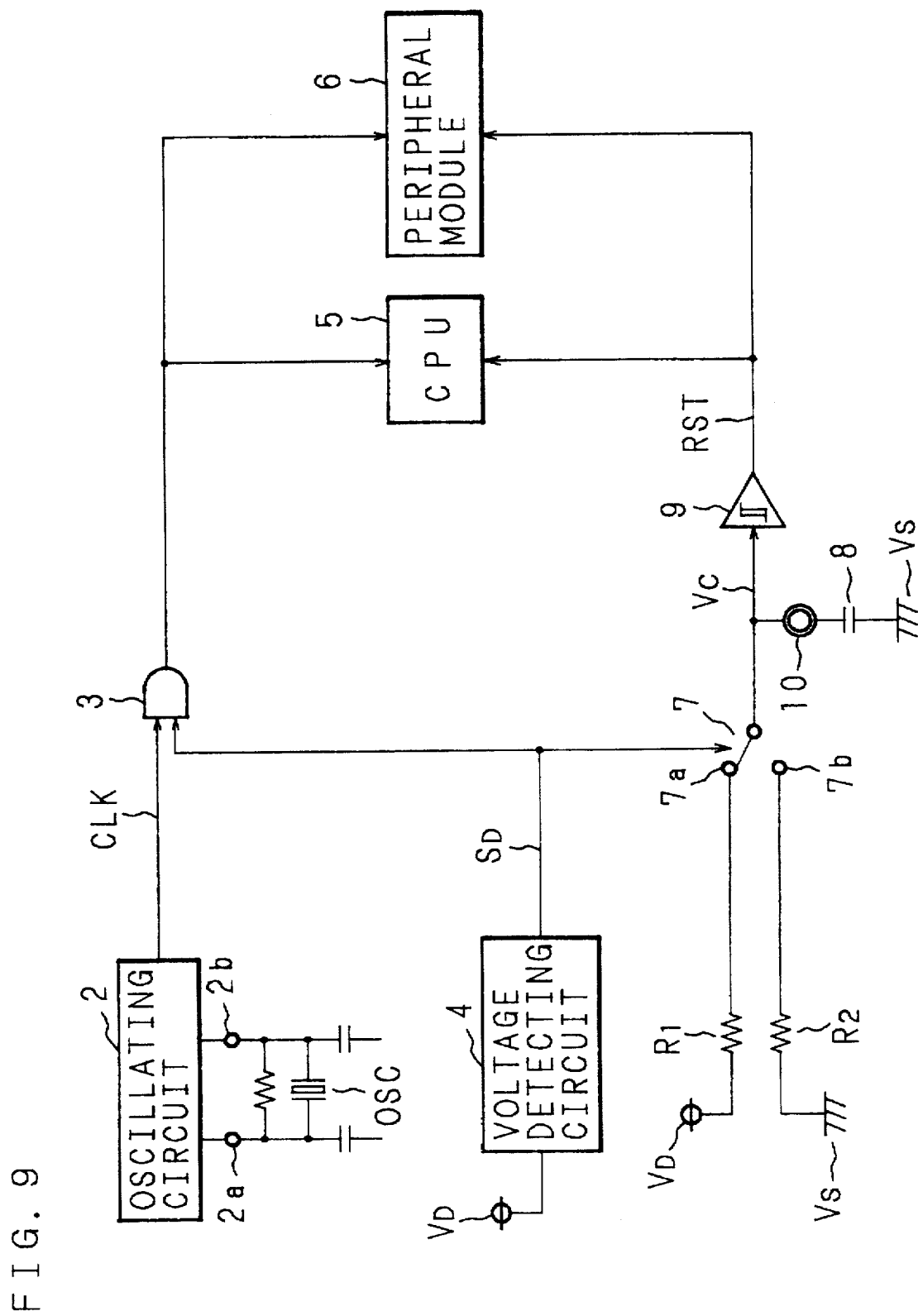
FIG. 9 is a block diagram showing a configuration of a second embodiment of the microcomputer according to the invention.

FIG. 9 is a block diagram showing a configuration of a second embodiment of the microcomputer according to the invention. A middle point of the connection between the selecting circuit 7 and Schmitt circuit 9 is connected to a capacitor connecting terminal 10 provided outside the microcomputer 10. The capacitor 8 is interposed between the capacitor connecting terminal 10 and the ground source $V_S$. The other points in configuration are the same as those shown in the microcomputer of FIG. 3, and the same components are designated by the same reference symbols.

This microcomputer operates in the same way as the microcomputer shown in FIG. 3.

Figure 10:
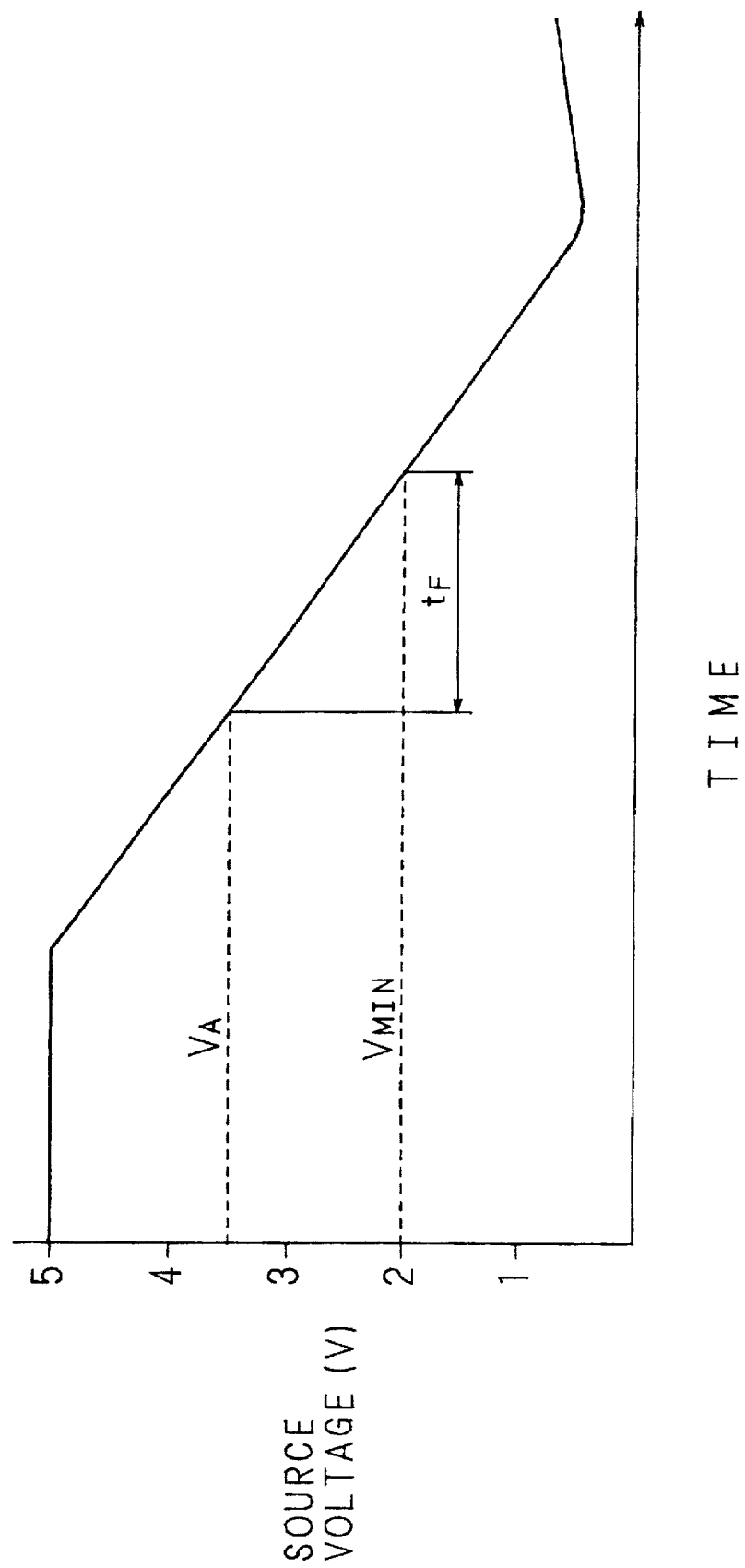
FIG. 10 is a characteristic diagram of the drop of the power source voltage.

How to select the delay time $t_d$ will be depicted with reference to FIG. 10.

The following description will be directed to a case where the microcomputer is integrated into a circuit showing a circuit characteristic, namely, a characteristic of the decrease of the voltage supplied to the microcomputer at the instantaneous cut-off of the power source as in FIG. 10. In the case where the microcomputer is used in the range of 4 to 6V of the power source voltage centering 5V, the source voltage detected by the voltage detecting circuit 4, that is, the reference voltage $V_B$ is set to be not larger than 4V and not smaller than a value allowing the microcomputer to operate normally without a problem, e.g., 3.5V. In the case where the minimum operation voltage $V_{MIN}$ whereby the microcomputer is recovered without a problem from the state where the supply of the clock signal CLK is stopped is 2V and the period in which the power source for the circuit incorporating the microcomputer decreases from the reference voltage $V_B$ to the minimum operation voltage $V_{MIN}$ is t seconds, a user of the microcomputer should select a capacity of the capacitor 8 to the resistance $R_2$ so that the delay time $t_d$ is not longer than $t_F$ seconds.

In this way, when the capacitor connecting terminal 10 is provided, the aforementioned delay time $t_d$ can be selected by the user so as to fit the characteristic, and so on of the power source filter of the circuit incorporating the microcomputer, and a capacitor having the corresponding capacity can be connected to the capacitor connecting terminal 10. Accordingly, even when the voltage drop characteristic of the power source of the circuit in which the microcomputer is integrated is different, a delay time corresponding to the respective circuit is obtained.

Embodiment 3

Figure 11:
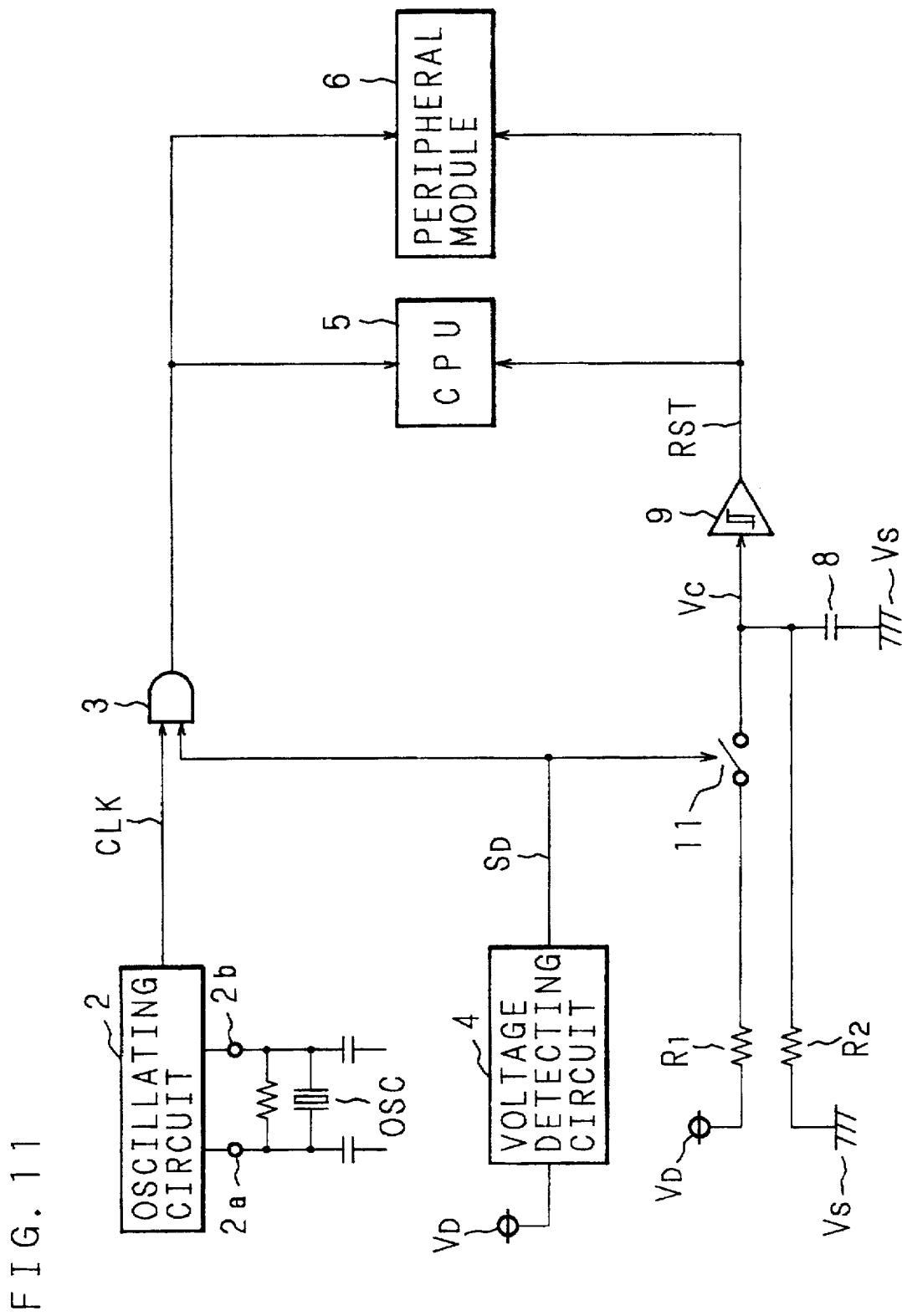
FIG. 11 is a block diagram showing a configuration of a third embodiment of the microcomputer according to the invention.
Figure 12:
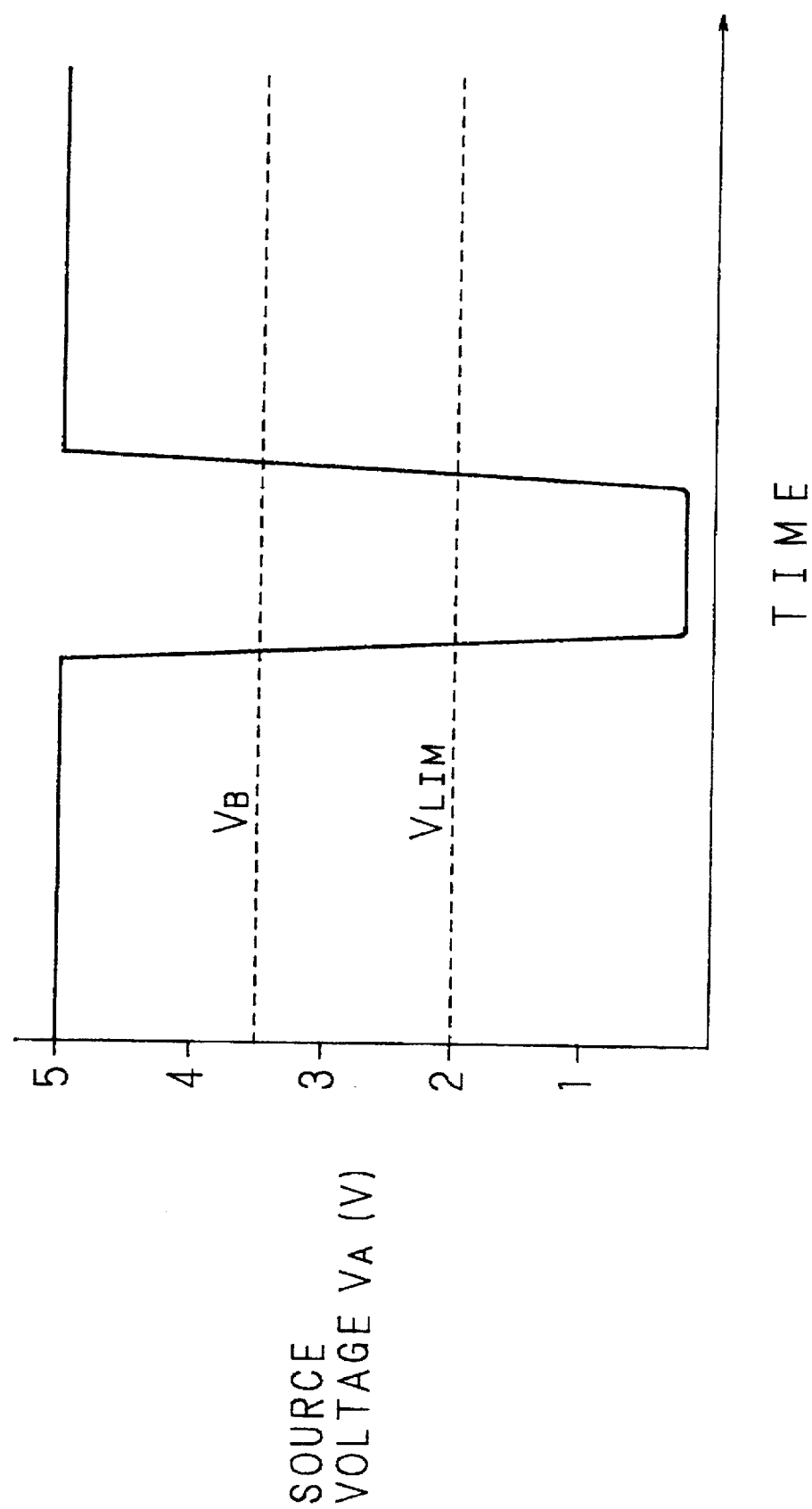
FIG. 12 characteristic diagram of the drop of the power source voltage.

FIG. 11 is a block diagram showing a configuration of a third embodiment of the microcomputer according to the invention. This third embodiment is suitable for a case where a circuit in which the microcomputer is integrated shows, as indicated in FIG. 12, such a characteristic that the voltage $V_A$ of the power source $V_D$ is immediately decreased by the instantaneous cut-off of the power source $V_D$. In the middle of the circuit where the resistance $R_1$ is connected with the Schmitt circuit 9, a switching circuit 11 consisting of a transfer gate is interposed. A middle point of the connection between the switching circuit 11 and Schmitt circuit 9 is connected to the resistance $R_2$, and also to the ground source $V_S$ via the capacitor 8. The other parts in configuration are the same as those of the microcomputer shown in FIG. 3 and the same components are denoted by the same reference symbols.

When a state where the source voltage $V_A$ is kept to be not larger than the minimum operation voltage $V_{MIN}$ of the microcomputer without the CPU 5 and peripheral module 6 reset continues for not smaller than a predetermined time, the microcomputer is impossible to return to the normal operation even when the voltage $V_A$ of the power source $V_D$ is recovered. Therefore, in the case where the voltage $V_A$ of the power source $V_D$ drops immediately and is readily turned not larger than the minimum operation voltage $V_{MIN}$, it is especially important to reset the CPU 5 and peripheral module 6 surely within the predetermined time.

The third embodiment ensures such resetting as above, the operation of which will be described now. When the voltage $V_A$ of the power source $V_D$ drops immediately to be not larger than the reference voltage $V_B$, the supply of the clock signal CLK to the CPU 5 and peripheral module 6 is stopped. When the voltage $V_A$ of the power source $V_D$ becomes lower than the reference voltage $V_B$, the voltage drop detection signal $V_D$ of the L level is outputted from the voltage detecting circuit 4 to open the switching circuit 11.

Then, the capacitor 8 is let to discharge through the resistance $R_2$. When the discharging is finished a predetermined delay time later, the input side of the Schmitt circuit 9 becomes the L level to output the reset signal RST of the L level, so that the CPU 5 and the peripheral module 6 are reset. After that, when the instantaneous cut-off of the power source $V_D$ is dissolved and the voltage drop detection signal $S_D$ is turned to the H level, the switching circuit 11 is closed. Thereby, the capacitor 8 is charged with a voltage obtained by dividing the voltage $V_A$ of the power source $V_D$ by the resistance, $R_1$ and $R_2$, and the input-side potential of the Schmitt circuit 9 is rendered the H level to output there set signal RST of the H level, thereby canceling the resetting of the CPU 5 and peripheral module 6.

The terminal voltage $V_C$ of the capacitor 8 when the switching circuit 11 is closed is as follows;

$$V_C = V_A \times R_2/(R_1+R_2) \quad (1)$$

In each of the embodiment 1 (FIG. 3) and the embodiment 2 (FIG. 9) wherein the selecting circuit 7 consisting of the transfer gate is disposed in the middle of the circuit connecting the resistance $R_2$ and Schmitt circuit 9, when the source voltage falls immediately as shown in FIG. 12, since the on-resistance of the transfer gate to let the capacitor 8 to discharge is increased suddenly, the capacitor 8 is hard to discharge, inviting a fear that it is difficult for the potential at the input-side potential of the Schmitt circuit 9 to be the L level. However, in this embodiment, since the transfer gate is not interposed at the discharging circuit of the capacitor 8, even when the source voltage immediately drops, the capacitor 8 is sure to discharge, positively making the potential at the input side of the Schmitt circuit 9 to be in the L level. Accordingly, the CPU 5 and the peripheral module 6 are surely reset.

Embodiment 4

Figure 13:
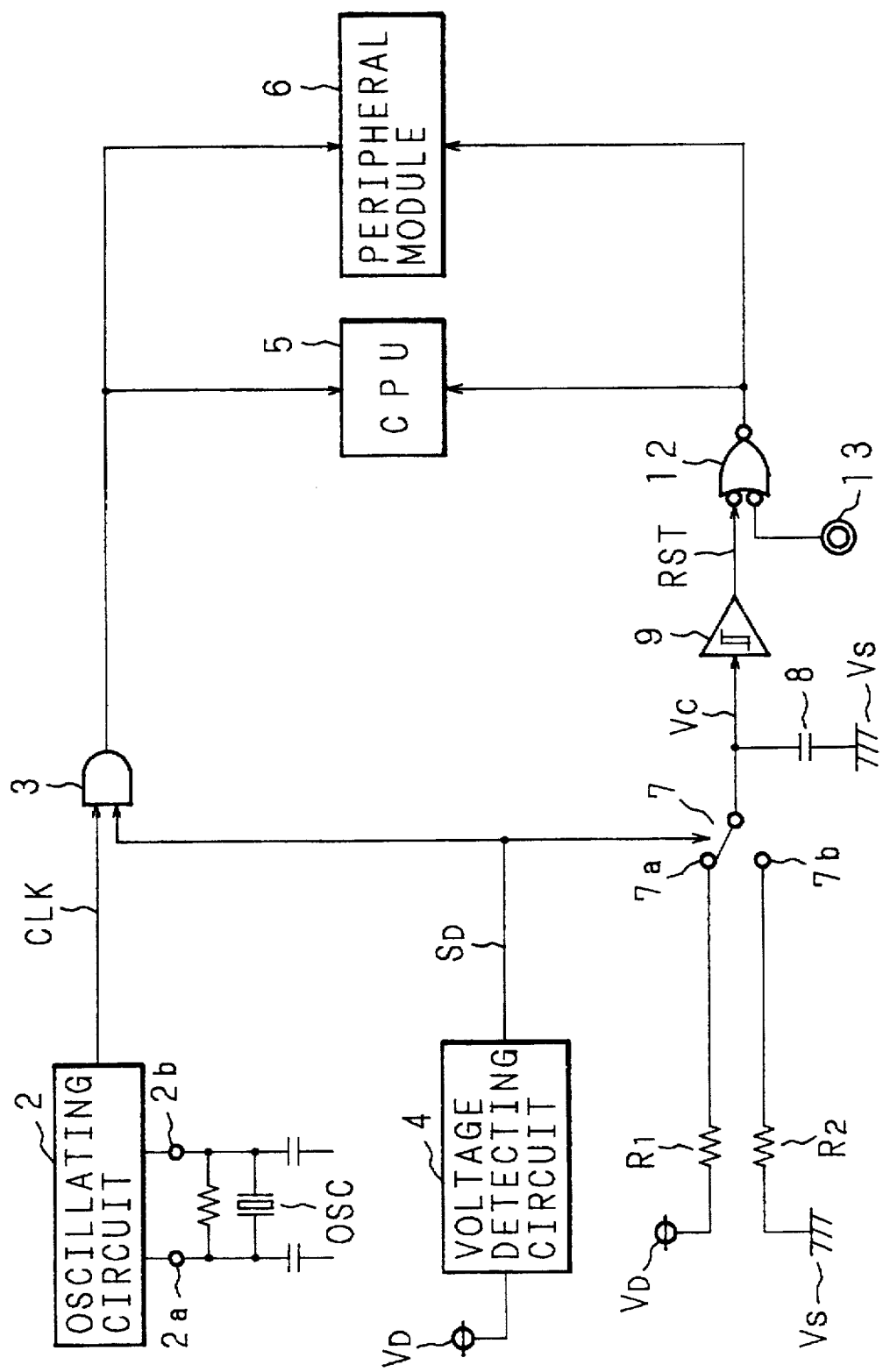
FIG. 13 is a block diagram showing a configuration of a fourth embodiment of the microcomputer according to the invention.

FIG. 13 is a block diagram showing a configuration of a fourth embodiment of the microcomputer according to the invention. The reset signal RST outputted from the Schmitt circuit 9 is inputted to one input terminal of an AND circuit 12. The microcomputer is provided with, a reset terminal 13 to which the reset signal is inputted from outside. The reset signal inputted to the reset terminal 13 is inputted to the other input terminal of the AND circuit 12. The reset signal RST outputted from the AND circuit 12 is inputted to reset terminals of the CPU 5 and peripheral module 6. The other parts in configuration are the same as those of the microcomputer shown in FIG. 3, and the same components have the same reference symbols.

In this embodiment, since the reset terminal 13 is provided, it is so arranged that the reset signal is inputted to the reset terminal 13, for example, when a reset button, of a circuit incorporating the microcomputer is manipulated, the reset signal of the L level is inputted to the reset terminal 13 through the resetting operation. Consequently, the reset signal of the L level is outputted from the AND circuit 12, so that the CPU 5 and peripheral module 6 are reset. The other operations are carried out in the same manner as those in the microcomputer in FIG. 3. Accordingly, the embodiment is applicable to a system in which a reset button and a power on reset button are used together.

Embodiment 5

Figure 14:
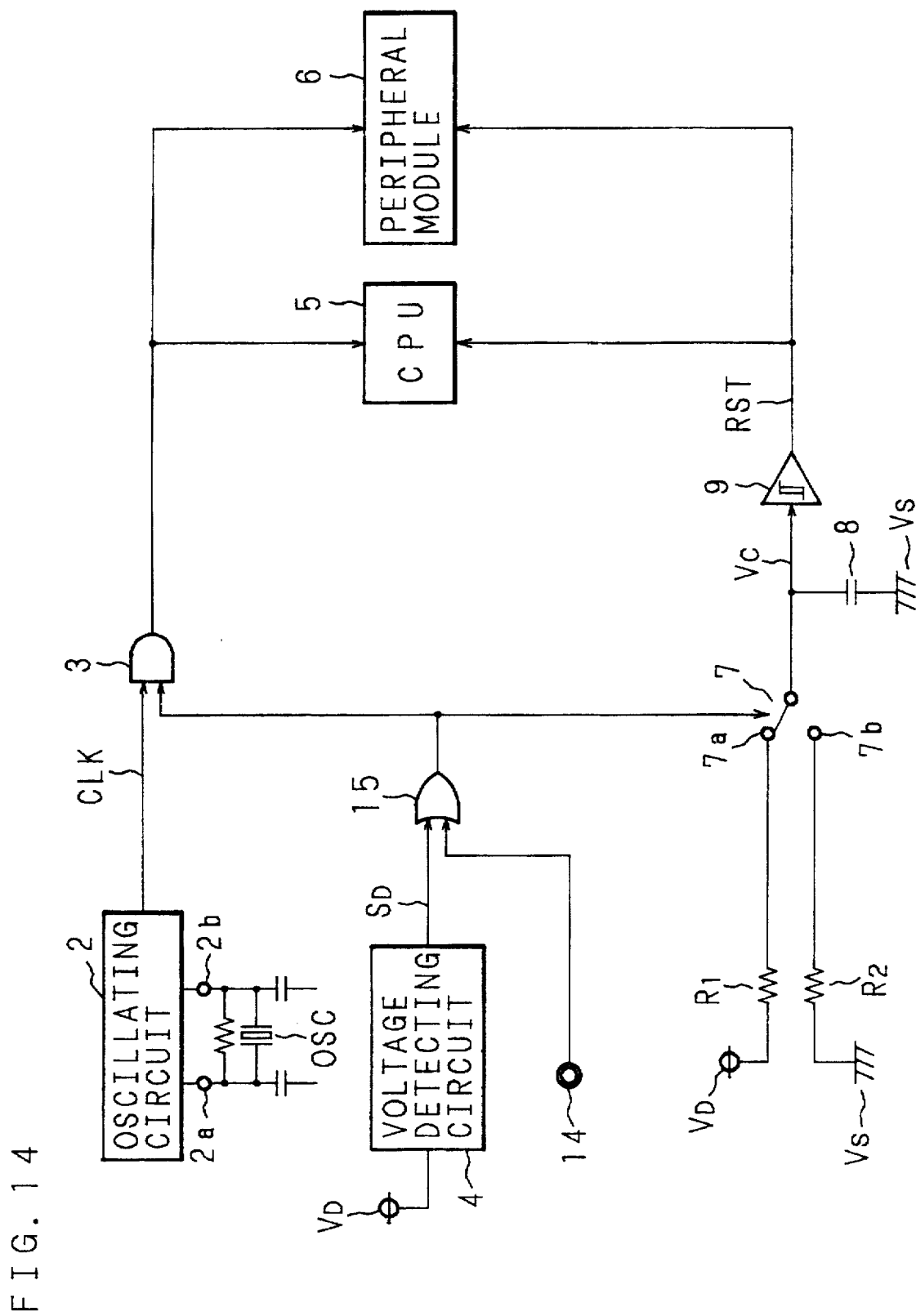
FIG. 14 is a block diagram showing a configuration of a fifth embodiment of the microcomputer according to the invention.

FIG. 14 is a block diagram showing a configuration of a fifth embodiment of the microcomputer according to the invention. A selecting terminal 14 is provided to enable/disable a voltage drop detecting function. The voltage drop detection signal $S_D$ outputted by the voltage detecting circuit 4 is inputted to one input terminal of an OR circuit 15, and to the other input terminal of the OR circuit 15 is inputted a signal from the selecting terminal 14. An output signal of the OR circuit 15 is inputted to the other input terminal of the AND circuit 3 and is also inputted to the selecting circuit 7 as the switching signal. The other parts in configuration are the same as those of the microcomputer in FIG. 3, and the same components are represented by the same reference symbols.

The operation of the microcomputer will be explained. When a signal of the H level is inputted to the OR circuit 15 through the selecting terminal 14, the signal is sent to the AND circuit 3 and selecting circuit 7 and the supply of the clock signal CLK from the AND circuit 3 is continued. Therefore, the operations of the CPU 5 and peripheral module 6 are not interrupted by the instantaneous cut-off of the power source. In this case, the one terminal 7a is kept to be selected by the selecting circuit 7 and the reset signal RST of the L level is not outputted from the Schmitt circuit 9, so that the CPU 5 and peripheral module 6 are not reset.

When a signal of the L level is inputted to the OR circuit 15 through the selecting terminal 14, the voltage drop detecting function is activated on the basis of the voltage drop detection signal $V_D$ from the voltage detecting circuit 4, and the microcomputer operates in the same way as the microcomputer of FIG. 3.

As described above, in the present embodiment, whether either the voltage drop detecting function is effected or the operation is continued is selectable in correspondence to the operation of the circuit incorporating the microcomputer when the power source is instantaneously cut off.

For example, in the case where the microcomputer is integrated in a circuit required to be accurate in terms of time, when the supply of the clock signal is stopped and the CPU 5 and peripheral module 6 are recovered after being reset, a timer in the microcomputer may disadvantageously change its value. As such, when the microcomputer is incorporated in such a circuit as above, the CPU 5 and the peripheral module 6 are adapted not to stop the operation even when the power source is cut off instantaneously, so that the time accuracy is ensured. In addition, since the microcomputer prohibits the resetting of the CPU 5 and peripheral module 6, it is desirable to set and use the reset terminal 13 alike as shown in FIG. 13.

Embodiment 6

Figure 15:
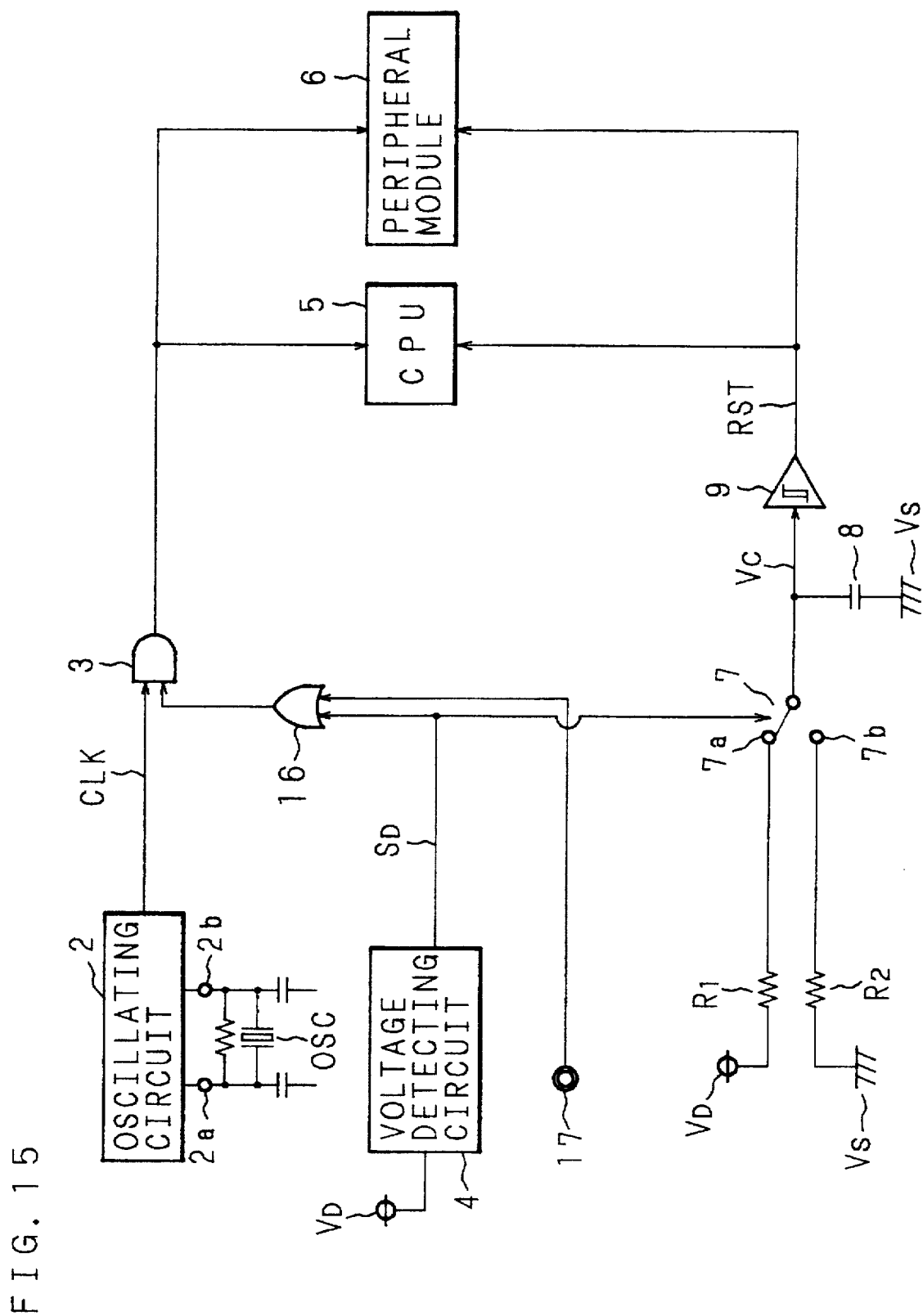
FIG. 15 is a block diagram showing a configuration of a sixth embodiment of the microcomputer according to the invention.

FIG. 15 is a block diagram showing a configuration of a sixth embodiment of the microcomputer according to the invention. In this microcomputer, a selecting terminal 17 is provided which inputs an enable/disable signal for the clock signal to the CPU 5 and peripheral module 6 by the voltage detecting circuit 4. The voltage drop detection signal $S_D$ outputted by the voltage detecting circuit 4 is inputted to one input terminal of an OR circuit 16 and also inputted to the selecting circuit 7 as the switching signal. To the other input terminal of the OR circuit 16 is inputted a signal from the selecting terminal 17 is inputted and the output signal of the OR circuit 16 is inputted to the other input terminal of the AND circuit 3. The other parts in configuration are the same as those of the microcomputer illustrated in FIG. 3 and the same components are with the same reference symbols.

The operation of the microcomputer of FIG. 15 will be depicted. This microcomputer operates, when a signal of the L level is inputted to the selecting terminal 17, in the same way as the microcomputer of FIG. 3. However, when a signal of the H level is inputted to the selecting terminal 17 at the time of the instantaneous cut-off of the power source, a shutting function of the clock signal is not executed, and the clock signal is supplied at all times. More specifically, since the signal of the H level via the selecting terminal 17 is inputted to the AND circuit 3 through the OR circuit 16, the supply of the clock signal CLK from the AND circuit 3 to the CPU 5 and peripheral module 6 is not shut even when the power source is cut off instantaneously. The CPU 5 and the peripheral module 6 keeps operating. On the other hand, since the voltage drop detection signal $S_D$ is inputted as it is from the voltage detecting circuit 4 to the selecting circuit 7, when the supplied voltage drop detection signal $S_D$ is the L level, the selecting circuit 7 selects the other terminal 7b and the Schmitt circuit 9 outputs the reset signal RST, whereby the CPU 5 and the peripheral module 6 are reset.

Embodiment 7

Figure 16:
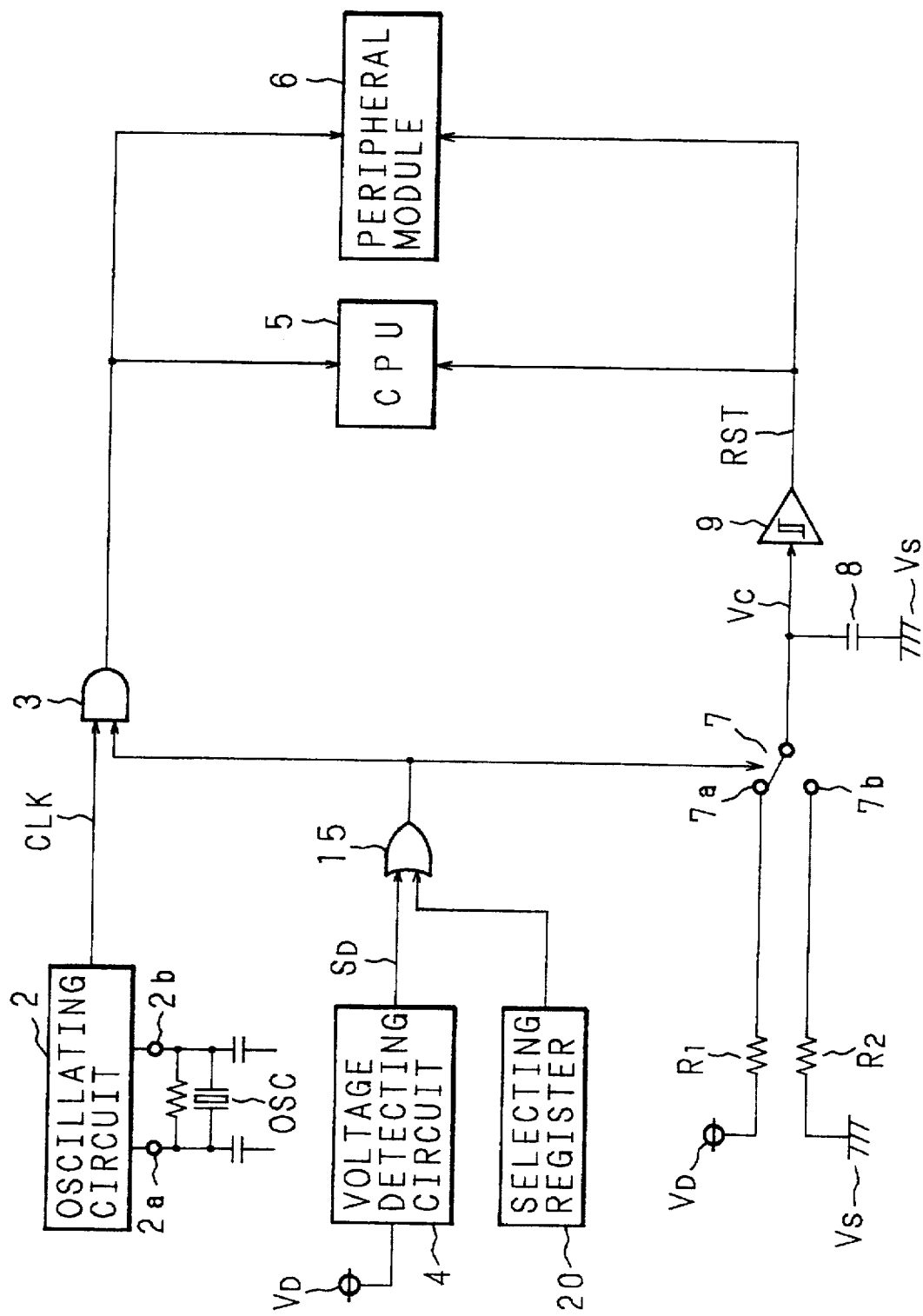
FIG. 16 block diagram showing a configuration of a seventh embodiment of the microcomputer according to the invention.

FIG. 16 is a block diagram showing a configuration of a seventh embodiment of the microcomputer according to the invention. A selecting register 20 is provided in the microcomputer for storing data to enable/disable the voltage drop detecting function. The voltage drop detection signal $S_D$ outputted from the voltage detecting circuit 4 is inputted to one input terminal of the OR circuit 15, and the content of the selecting register 20 is inputted to the other input terminal of the OR circuit 15. An output signal of the OR circuit 15 is inputted to the AND circuit 3 and the selecting circuit 7. The other parts in configuration are the same as those in the microcomputer in FIG. 14, and the same components are in the same reference symbols.

The explanation below will be made on the operation of the microcomputer. This microcomputer operates in the same way as in FIG. 14 with the selecting terminal 14 when data of the selecting register 20 are set by, for example, a software.

The microcomputer may have a configuration such that it is provided with a selecting register in which data for supplying the clock signal CLK are written and a selecting register in which data for outputting the reset signal RST are written in a combination of FIGS. 13 and 16, or that the reset terminal 13 of FIG. 13 is replaced by a selecting register in which data of the reset signal RST are written, so that data are written in respective registers.

Although are selecting terminal or one selecting register are provided in any of the foregoing embodiments, it may be devised to control the clock signal CLK and the reset signal RST separately by providing two selecting terminals or two selecting registers.

Embodiment 8

Figure 17:
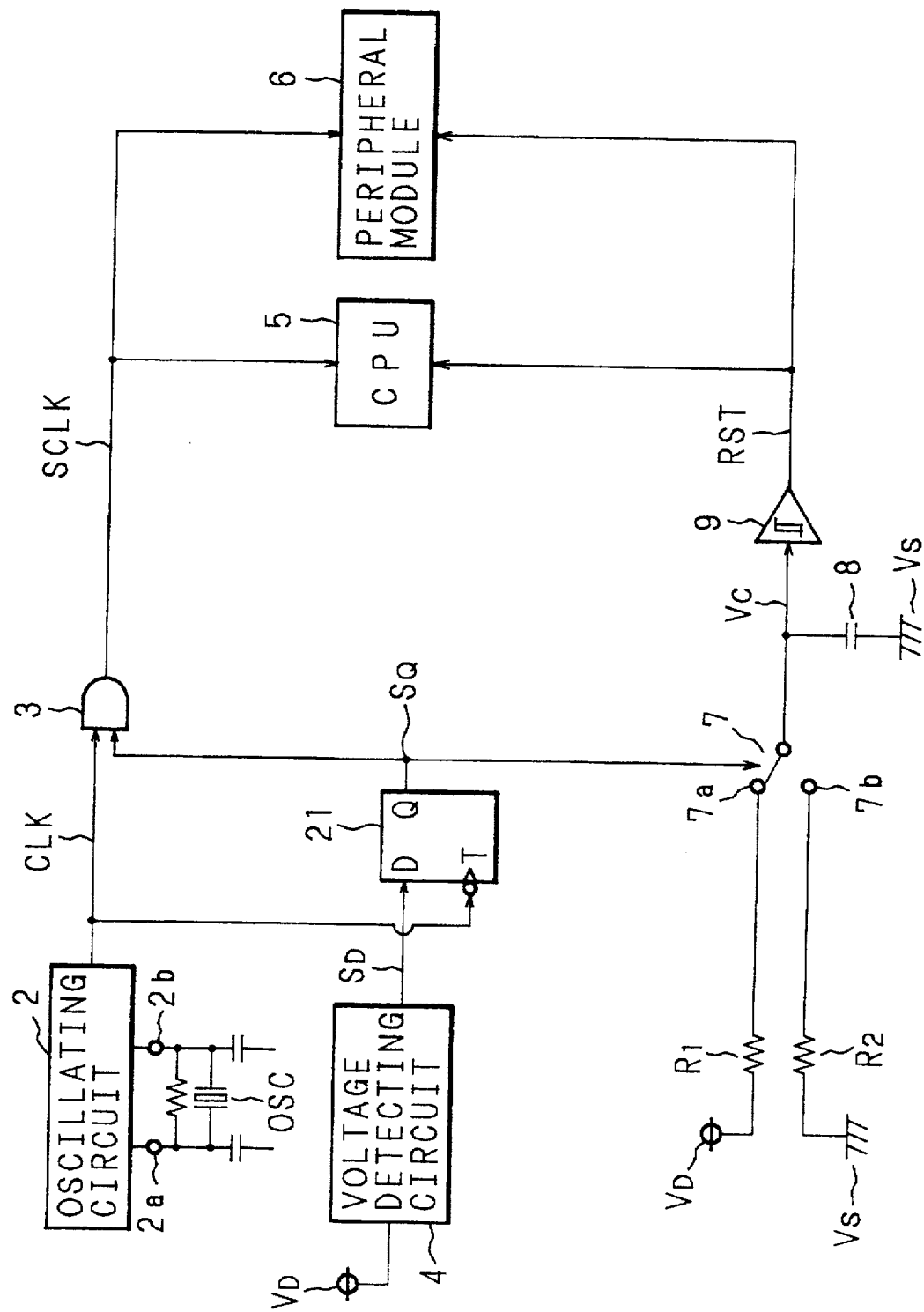
FIG. 17 is a block diagram showing a configuration of an eighth embodiment of the microcomputer according to the invention.

FIG. 17 is a block diagram showing a configuration of an eighth embodiment of the microcomputer according to the invention. The voltage drop detection signal $S_D$ outputted from the drop detecting circuit 4 is inputted to an input terminal D of a D-flip flop 21. The clock signal CLK outputted by the oscillating circuit 2 is inputted to a trigger terminal of the D-flip flop 21. A signal $S_Q$ outputted from an output terminal Q of the D flip flop 21 is inputted to the other input terminal of the AND circuit 3 and also to the selecting circuit 7 as the switching signal. The other parts in configuration are the same as those shown in FIG. 3 and the same components are indicated by the same reference symbols.

Figure 18:
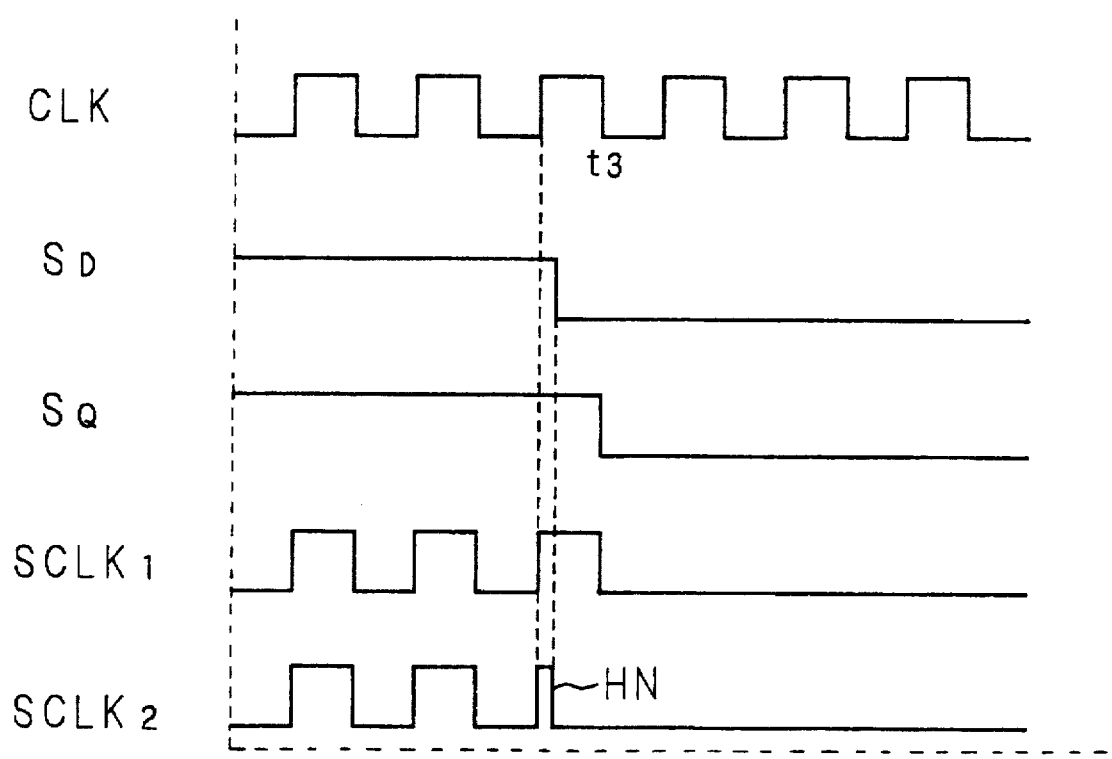
FIG. 18 is a timing chart of each signal.

The operation of the microcomputer will be described with reference to FIG. 18 which is a timing chart of each signal. In FIG. 17 and FIG. 18, the output signal from the AND circuit 3 is represented as a system clock signal SCLK.

Without the instantaneous cut-off of the power source $V_D$, the clock signal CLK is outputted from the oscillating circuit 2, the voltage drop detection signal $S_D$ of the H level is outputted from the voltage detecting circuit 4 and the signal $S_Q$ of the H level is outputted from the output terminal Q of the D-flip flop 21. In consequence, the system clock signal SCLK of the same waveform as that of the clock signal CLK is outputted from the AND circuit 3 to drive the CPU 5 and peripheral module 6. At the same time, the one terminal 7a of the selecting circuit 7 is selected by the signal $S_Q$ of the H level, the terminal voltage $V_C$ of the capacitor 8 becomes the H level and the reset signal RST of the H level is outputted from the Schmitt circuit 9, whereby the CPU 5 and the peripheral module 6 are not reset. Accordingly, in the case where the power source $V_D$ is not cut off instantaneously, this microcomputer operates in the same way as the one shown in FIG. 3. When the power source $V_D$ is cut off instantaneously and the voltage drop detection signal $S_D$ of the voltage detecting circuit 4 is inverted to the L level, the microcomputer operates in a different manner from the one shown in FIG. 3.

The operation when the D-flip flop 21 is not provided (FIG. 3) will be first depicted. When the power source $V_D$ is cut off instantaneously and the voltage drop detection signal $S_D$ of the voltage detecting circuit 4 is inverted to the signal $S_D$ of the voltage detecting circuit 4 is inverted to the L level, a system clock signal $SCLK_2$ falls at the time point. In the case where the power source $V_D$ is instantaneously cut off with a timing immediately after the rise of the clock signal CLK as shown in FIG. 18, a hazard HN of a short time width is generated in the system clock signal $SCLK_2$. When the system clock signal $SCLK_2$ including the hazard HN is inputted, the CPU 5 may erroneously operate or run out of control. Thereafter, since the system clock signal $SCLK_2$ is in the L level while the voltage drop detection signal $S_D$ is in the L level, that is, the clock signal CLK is cut off, the CPU 5 and peripheral module 6 are stopped.

When the voltage drop detection signal $S_D$ is in the L level, the selecting circuit 7 selects the other terminal 7b, and the terminal voltage $V_C$ of the capacitor 8 starts to decrease. When the terminal voltage $V_C$ is brought to the L level, the reset signal RST of the L level is outputted from the Schmitt circuit 9, thereby resetting the CPU 5 and the peripheral module 6.

Meanwhile, in the embodiment (FIG. 17) provided with the D-flip flop 21, when the voltage drop detection signal $S_D$ is inverted to the L level, the signal $S_Q$ falling at a succeeding time point $t_3$ when the clock signal CLK falls is outputted from the output terminal Q of the D-flip flop 21. Then, a system clock signal $SCLK_1$ also falls with maintaining a general pulse width, that is, no hazard HN is generated. Accordingly, the CPU 5 is prevented from erroneously operating or running away, not operating similarly to the clock signal of a high frequency.

Since the system clock signal $SCLK_1$ is in the L level afterwards while the voltage drop detection signal $S_D$ is in the L level as mentioned before, in other words, since the clock signal CLK is in the cut-off state, the operations of the CPU 5 and peripheral module 6 are stopped.

When the selecting circuit 7 selects the other terminal 7b to decrease the terminal voltage $V_C$ of the capacitor 8 to the L level as the signal $S_Q$ becomes the L level, the reset signal RST of the L level is outputted from the Schmitt circuit 9, whereby the CPU 5 and the peripheral module 6 are reset.

In this embodiment, the clock signal CLK outputted by the oscillating circuit 2 are synchronized with the voltage drop detection signal $S_D$ by the D-flip flop 21. However, use of the D-flip flop 21 is a mere example and anything is employable so long as it has the same latching function.

While the voltage drop detection signal $S_D$ synchronized as above is inputted to the selecting circuit 7 as well, the voltage drop detection signal $S_D$ not synchronized with the clock signal CLK from the oscillating circuit 2 may be directly inputted to the selecting circuit 7.

Embodiment 9

Figure 19:
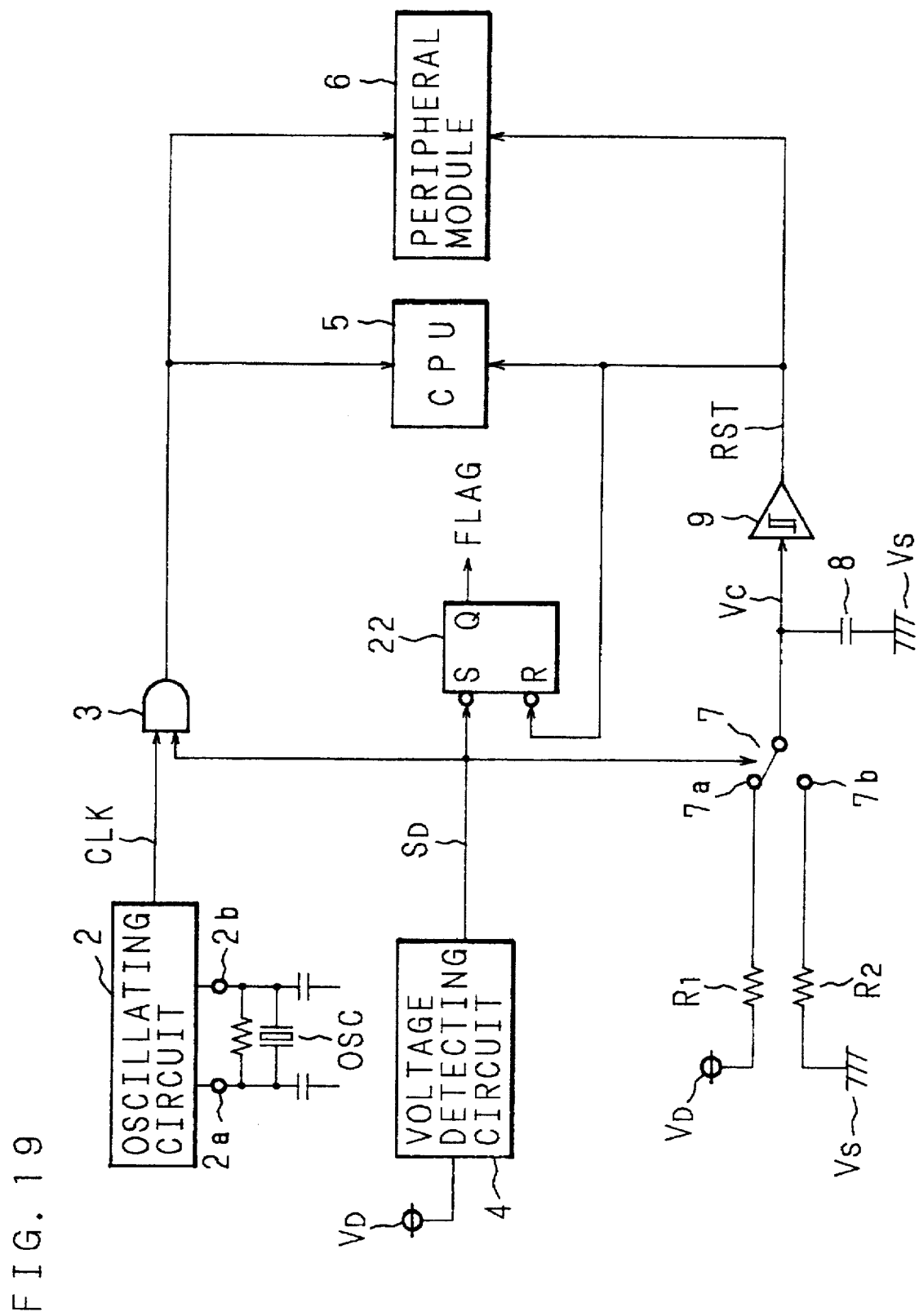
FIG. 19 is a block diagram showing a configuration of a ninth embodiment of the microcomputer according to the invention.

FIG. 19 is a block diagram showing a configuration of a ninth embodiment of the microcomputer according to the invention. The voltage drop detection signal $S_D$ outputted from the voltage detecting circuit 4 is inputted to a set terminal S of an RS flip flop 22, and the reset signal RST outputted from the Schmitt circuit 9 is inputted to a reset terminal R of the RS flip flop 22. A signal from an output terminal Q of the RS flip flop 22 is so designed as to be read through the CPU 5 as a flag. The other parts in configuration are the same as those in the microcomputer in FIG. 3, and the same components are shown by the same reference symbols.

The operation of the microcomputer will be described below. When the power source $V_D$ is instantaneously cut off and the voltage drop detection signal $S_D$ of the L level is outputted from the voltage detecting circuit 4, the supply of the clock signal CLK from the AND circuit 3 to the CPU 5 and peripheral module 6 is stopped, thereby stopping the CPU 5 and the peripheral module 6. Because of the voltage drop detection signal $S_D$ in the L level, the RS flip flop 22 is set. Then, when the instantaneous cut-off of the power source continues and the potential of the reset signal RST becomes the L level, the RS flip flop 22 is reset. The other parts in operation are the same as those of the microcomputer shown in FIG. 3.

Accordingly, when the content of the RS flip flop 22 is periodically read out, it can be recognized that the supply of the clock signal CLK is temporarily shut as the power source is cut off after the CPU 5 and peripheral module 6 are reset subsequent to the turning-on of the power source or the instantaneous cut-off of the power source.

In this embodiment, it is so configured that the signal from the output terminal Q of the RS flip flop 22 is inputted to the flag to read the content thereof. However, the invention is not limited to the RS flip flop. In some circuits incorporating the microcomputer, it is more desirable to generate an interruption request signal, not a flag, to switch the program immediately after the instantaneous cut-off of the power source, which is realized in the same way as the embodiment.

Embodiment 10

Figure 20:
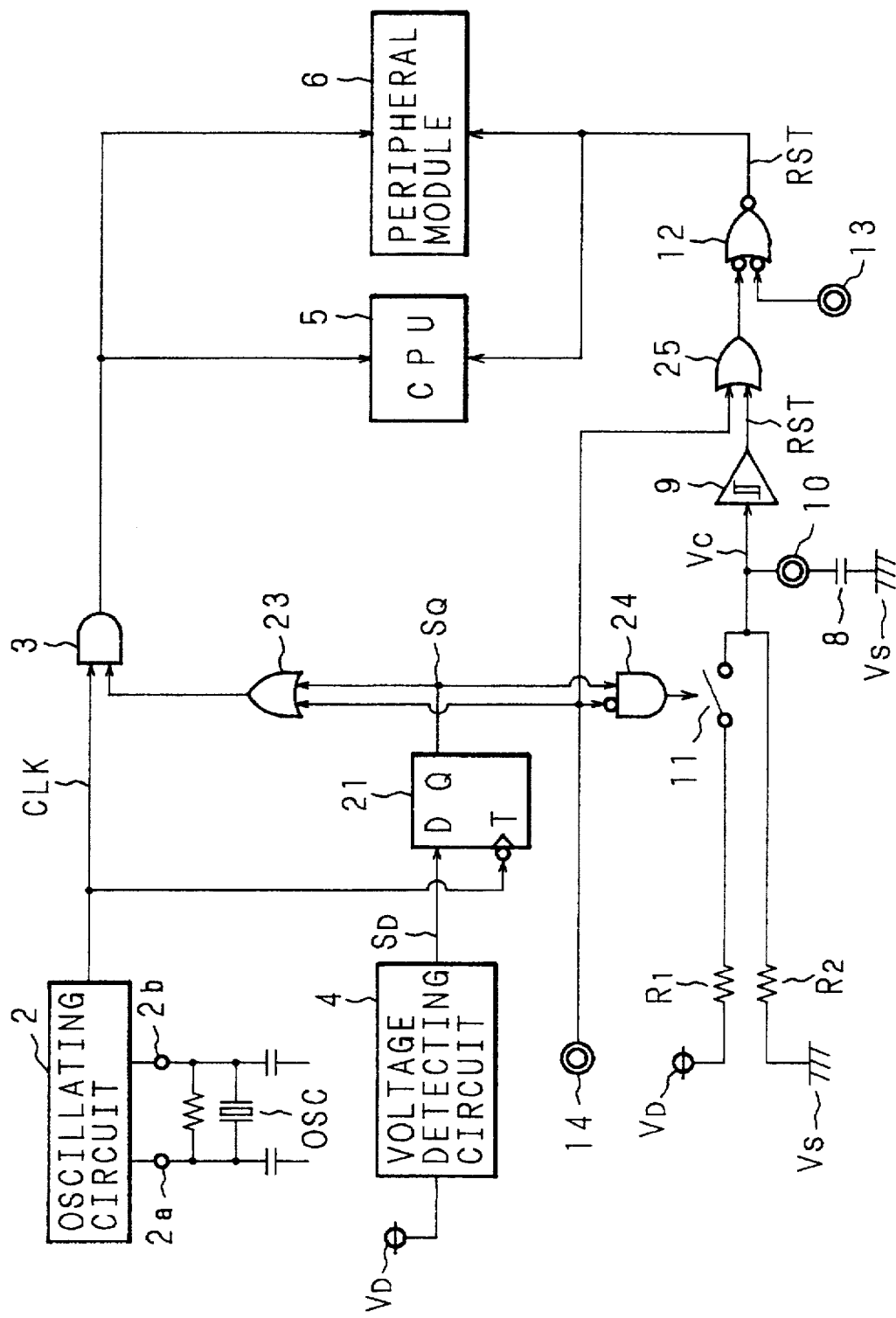
FIG. 20 is a block diagram showing a configuration of a tenth embodiment of the microcomputer according to the invention.

FIG. 20 is a block diagram showing a configuration of a tenth embodiment of the microcomputer according to the invention. The clock signal CLK outputted from the oscillating circuit 2 having the oscillator OSC connected thereto is inputted to the one input terminal of the AND circuit 3 and the trigger terminal T of the D-flip flop 21. The voltage drop detection signal $S_D$ outputted from the voltage detecting circuit 4 is inputted to the input terminal D of the D-flip flop 21. The output signal $S_Q$ from the output terminal Q of the D-flip flop 21 is inputted to one input terminal of an OR circuit 23 and one input terminal of an AND circuit 24. A signal inputted to the selecting terminal 14 is inputted to the other input terminal of the OR circuit 23 and the other input terminal of the AND circuit 24, and is also inputted to one input terminal of an OR circuit 25. An output signal of the OR circuit 23 is inputted to the other input terminal of the AND circuit 3. The clock signal CLK outputted from the AND circuit 3 is inputted to the CPU 5 and the peripheral module 6 consisting of a ROM, RAM and the like.

An output signal of the AND circuit 24 is inputted to the switching circuit 11 as the switching signal. The voltage of the power source $V_D$ is inputted to the Schmitt circuit 9 through the resistance $R_1$ and switching circuit 11, and to one terminal of the capacitor 8 through the resistance $R_1$, the switching circuit 11 and the capacitor connecting terminal 10. The other terminal of the capacitor 8 is connected to the ground source $V_S$. The ground source $V_S$ is connected to the input side of the Schmitt circuit 9 through the resistance $R_2$. The reset signal RST outputted from the Schmitt circuit 9 is inputted to the other input terminal of the OR circuit 25. An output signal of the )R circuit 25 is inputted to one input terminal of the AND circuit 12 and to the other input terminal of the circuit 12 is inputted, the reset signal having been inputted to the reset terminal 13. The reset signal RST outputted from the OR circuit 12 is fed to the respective reset terminals of the CPU 5 and peripheral module 6.

The operation of the above microcomputer will be described.

The explanation will be given on a case where the selecting terminal 14 is in L level and the selecting terminal 13 is in H level, i.e., where the voltage drop detecting function is actuated and the resetting is not instructed from outside. When there is no instantaneous cut-off of the power source $V_D$ and no drop of the voltage of the power source $V_D$ is present, the voltage drop detection signal $S_D$ is in the H level and the output signal $S_Q$ of the output terminal Q of the D-flip flop 21 is in the H level. This signal $S_Q$ is inputted to the AND circuit 3 through the OR circuit 23 which in turn outputs the clock signal CLK from the AND circuit 3, so that the CPU 5 and peripheral module 6 are operated. Since the signal $S_Q$ is in the H level, the output signal of the circuit 24 is in the H level, and the switching circuit 11 is closed to charge the capacitor 8. Accordingly, the input side of the Schmitt circuit 9 is in the H level and the reset signal RST of the H level is outputted from the Schmitt circuit 9. This reset signal RST is inputted to the AND circuit 12 through the OR circuit 25, and outputted from the AND circuit 12, so that the CPU 5 and peripheral module 6 are not reset.

When the voltage drop detection signal $S_D$ of the L level is outputted due to the instantaneous cut off of the power source $V_D$, in synchronization with the fall of the clock signal CLK thereafter, the output signal $S_Q$ of the D-flip flop 21 is turned to the L level and the clock signal CLK is not outputted from the AND circuit 3. The CPU 5 and the peripheral module 6 are accordingly stopped. Since the signal $S_Q$ outputted from the output terminal Q of the D-flip flop 21 becomes the L level, the output signal of the AND circuit 24 is changed to the L level to open the switching circuit 11, whereby the capacitor 8 is let to discharge and the input side of the Schmitt circuit 9 becomes the L level. The reset signal RST of the L level is outputted from the Schmitt circuit 9 to the AND circuit 12 through the OR circuit 25, then the reset signal RST of the L level is outputted from the AND circuit 12 so as to reset the CPU 5 and the peripheral module 6.

In this way, since the signal $S_Q$ of the L level from the output terminal Q of the D-flip flop 21 is outputted in synchronization with the clock signal CLK from the oscillating circuit 2, no hazard is brought about when the outputting of the clock signal CLK from the AND circuit 3 is shut.

The explanation below will be referred to a case where the selecting terminal 14 is in H level, that is, where the voltage drop detecting function is not operated. When the signal of the H level is inputted to the selecting terminal 14, the clock signal CLK is continuously fed from the AND circuit 3 even when the voltage drop detection signal $S_D$ is turned to the L level by the instantaneous cut-off of the power source. On the other hand, the output signal of the AND circuit 24 becomes the L level and the switching circuit 11 is opened thereby to shut a current flowing from $V_D \rightarrow R_1 \rightarrow R_2$ to $V_S$. The output of the Schmitt circuit 9 becomes the L level. However, since the signal of the H level is inputted from the selecting terminal 14 to the other input terminal of the OR circuit 25, the reset signal RST is brought to the H level, whereby the CPU 5 and the peripheral module 6 are not reset.

When the signal of the L level is inputted to the reset terminal 1B, the reset signal RST of the L level is outputted regardless of the output level of the Schmitt circuit 9, so that the CPU 5 and the peripheral module 6 are reset.

Since there is no switching circuit consisting of the transfer gate whose on-resistance is increased by the voltage decrease of the power source $V_D$ disposed in the middle of the circuit where the resistance $R_2$ is connected to the Schmitt circuit 9, the input side of the Schmitt circuit 9 is surely turned to the L level, ensuring allowances for the reset circuit to operate.

Because of the presence of the capacitor connecting terminal 10, a user of the microcomputer can select the capacity of the capacitor so that the delay time from the instantaneous cut-off of the power source to the resetting corresponds to a shorter time than the time while the microcomputer achieves the minimum operation voltage $V_{MIN}$ from the reference voltage $V_B$. Accordingly, the CPU 5 and the peripheral module 6 can be reset before the voltage not larger less than the minimum operation voltage $V_{MIN}$.

When the voltage drop detection signal $S_D$ is outputted, since the clock signal CLK from the AND circuit 3 is interrupted in synchronization with the voltage drop detection signal $S_D$, the hazard is generated from the AND circuit 3 to avoid the runaway of the programmed operation.

As mentioned above, when the signal of the L level is inputted to the selecting terminal 14, whether to output the clock signal CLK and the reset signal RST is controlled on the basis of the voltage drop detection signal $S_D$. When the signal of the H level is inputted to the selecting terminal 14, the supply of the clock signal CLK is continued even if the power source is cut off. When the signal of the H level is inputted to the selecting terminal 14 so as to continue the supply of the clock signal CLK, the output of the AND circuit 24 becomes the L level to open the switching circuit 11, whereby the current does not flow from the power source $V_D$ through the resistances $R_1$ and $R_2$, resulting in saving of the consuming power. In this case, the CPU 5 and peripheral module 6 are reset by inputting the reset signal of the L level to the reset terminal 13.

When the aforementioned selecting terminal 17, the selecting register 20 or the RS flip flop 22 is provided in the microcomputer in FIG. 10 in the same way, it is needless to say that the same effect is obtained.

Although the transfer gate is employed for the selecting circuit and the switching circuit, the invention is not limited to the transfer gate.

Further, although the circuit which delays the change of the potential of the input side of the Schmitt circuit is composed of the resistance and the capacitor, it can be constituted of a transistor of a small driving efficiency. A delay circuit including the part of the selecting circuit may be used.

The terminal voltage of the capacitor is inputted to the Schmitt circuit so as to prevent the reset signal from being erroneously outputted as a result of noises due to a large distortion of the waveform of the terminal voltage. The invention is not limited to the Schmitt circuit. Still more, although the oscillator is connected to the outside with the use of the connecting terminal connected to the oscillating circuit, needless to say, the same effect is attained even in the case where the oscillator is not connected to the outside.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A microcomputer, comprising:
   a oscillating circuit providing a clock signal to execute a program in accordance with said clock signal;
   a voltage detecting circuit for detecting a voltage drop of a power source and outputting a detection signal;
   a logical gate circuit receiving said clock signal and said detection signal, said gate circuit outputting said clock signal to a circuit exciting the program when no voltage drop is detected and stopping outputting said clock signal when voltage drop is detected;
   a reset signal generating means for generating a reset signal to reset an operation according to the program; and
   a delay circuit for feeding a first voltage to said reset signal generating means when the detection signal from said voltage detecting circuit is more than a predetermined level and a second voltage, different from the first level, to said reset signal generating means after a predetermined delay period when the detection signal from said voltage detecting circuit drops to a level less than the predetermined level, wherein
   said reset signal generating means generates said reset signal on the basis of an output signal from said delay circuit.

2. A microcomputer comprising:
   a oscillating circuit providing a clock signal to execute a program in accordance with said clock signal;
   a voltage detecting circuit for detecting a voltage drop of a first power source and outputting a detection signal;
   a logical gate circuit receiving said clock signal and said detection signal;

a reset signal generating means for generating a reset signal to reset an operation according to the program; and a delay circuit for delaying the detection signal from said voltage detecting circuit and feeding the signal to said reset signal generating means, wherein said reset signal generating means generates said reset signal on the basis of an output signal from said delay circuit, said delay circuit includes:
a first resistance connected to said first power source,
a second resistance connected to a second power source,
a selecting circuit for selecting either the first resistance or the second resistance, and
a capacitor connected either to the first resistance or to the second resistance selected by said selecting circuit, said reset signal generating means generates a reset signal on the basis of a charged voltage of said capacitor, and the selection of said selecting circuit is controlled by the detection signal of said voltage detecting circuit.

3. A microcomputer as set forth in claim 2, further comprising a capacitor connecting terminal for connecting said capacitor to an external capacitor.

4. A microcomputer as set forth in claim 2, further comprising a second logical circuit to which said reset signal and a reset signal inputted from outside are to be inputted.

5. A microcomputer as set forth in claim 2, further comprising a third logical circuit to which said detection signal and a selecting signal inputted from outside for selecting whether a voltage drop detecting function is to be operated are to be inputted, wherein the selection of said selecting circuit is controlled by an output signal from said third logical circuit.

6. A microcomputer as set forth in claim 2, further comprising a third logical circuit to which said detection signal and a selecting signal inputted from outside for selecting whether a voltage drop detecting function is to be operated are to be inputted, wherein the open/closed state of said switching circuit is controlled by an output signal of said third logical circuit, and the output signal of said third logical circuit is inputted to said first logical circuit and said selecting circuit.

7. A microcomputer as set forth in claim 2, further comprising a first latching means for latching the detection signal of said voltage detecting circuit, wherein an output signal of said latching means is rendered to be one input to said first logical circuit.

8. A microcomputer as set forth in claim 2, further comprising a second latching means for outputting a signal to indicate whether the reset signal is in an active state after said detection signal is turned into the active state.

9. A microcomputer as set forth in claim 2, which is so configured that a CPU program is switched in the case where an output signal of the second latching means indicates that said detection signal is in the active state.

10. A microcomputer as set forth in claim 2, further comprising:
a capacitor connecting terminal for connecting said capacitor to another capacitor;
a latching means for latching said detection signal of the voltage detecting circuit;
a second logical circuit to which the reset signal outputted by said reset signal generating means and a reset signal inputted from outside are to be inputted; and a third logical circuit to which the detection signal of said voltage detecting circuit and a selection signal inputted from outside for selecting on the basis of the detection signal whether the programmed operation is to be stopped are to be inputted, wherein the selection of said selecting circuit is controlled by an output signal of said third logical circuit, an output signal of said latching means is rendered to be one input to said third logical circuit, and the output signal of said third logical circuit is rendered to be one input to said first logical circuit.

11. A microcomputer, comprising:
a oscillating circuit providing a clock signal to execute a program in accordance with said clock signal;
a voltage detecting circuit for detecting a voltage drop of a first power source and outputting a detection signal;
a logical gate circuit receiving said clock signal and said detection signal;
a reset signal generating means for generating a reset signal to reset an operation according to the program; and
a delay circuit for delaying the detection signal from said voltage detecting circuit and feeding the signal to said reset signal generating means, wherein said reset signal generating means generates said reset signal on the basis of an output signal from said delay circuit, said delay circuit includes
a resistance connected to a second power source,
a selecting circuit for selecting either the first power source or said resistance, and
a capacitor connected either to the first power source or to said resistance selected by said selecting circuit, said reset signal generating means generates a reset signal on the basis of a charged voltage of said capacitor, and the selection of said selecting circuit is controlled by the detection signal of said voltage detecting circuit.

12. A microcomputer as set forth in claim 11, further comprising a capacitor connecting terminal for connecting said capacitor to an external capacitor.

13. A microcomputer as set forth in claim 11, further comprising a second logical circuit to which said reset signal and a reset signal inputted from outside are to be inputted.

14. A microcomputer as set forth in claim 11, further comprising a third logical circuit to which said detection signal and a selecting signal inputted from outside for selecting whether a voltage drop detecting function is to be operated are to be inputted, wherein the selection of said selecting circuit is controlled by an output signal from said third logical circuit.

15. A microcomputer as set forth in claim 11, further comprising a third logical circuit to which said detection signal and a selecting signal inputted from outside for selecting whether a voltage drop detecting function is to be operated are to be inputted, wherein the open/closed state of said selecting circuit is controlled by an output signal of said third logical circuit, and the output signal of said third logical circuit is inputted to first logical circuit and said selecting circuit.

16. A microcomputer as set forth in claim 11, further comprising a first latching means for latching the detection signal of said voltage detecting circuit, wherein an output signal of said latching means is rendered to be one input to said first logical circuit.

17. A microcomputer as set forth in claim 11, further comprising a second latching means for outputting a signal to indicate whether the reset signal is in an active state after said detection signal is turned into the active state.

18. A microcomputer as set forth in claim 11, which is so configured that a CPU program is switched in the case where an output signal of the second latching means indicates that said detection signal is in the active state.

19. A microcomputer as set forth in claim 11, further comprising:

a capacitor connecting terminal for connecting said capacitor to another capacitor;

a latching means for latching said detection signal of the voltage detecting circuit;

a second logical circuit to which the reset signal outputted by said reset signal generating means and a reset signal inputted from outside are to be inputted; and a third logical circuit to which the detection signal of said voltage detecting circuit and a selection signal inputted from outside for selecting on the basis of the detection signal whether the programmed operation is to be stopped, wherein the selection of said selecting circuit is controlled by an output signal of said third logical circuit, an output signal of said latching means is rendered to be one input to said third logical circuit, and the output signal of said third logical circuit is rendered to be one input to said first logical circuit.

20. A microcomputer, comprising:

a oscillating circuit providing a clock signal to execute a program in accordance with said clock signal;

a voltage detecting circuit for detecting a voltage drop of a first power source and outputting a detection signal;

a logical gate circuit receiving said clock signal and said detection signal;

a reset signal generating means for generating a reset signal to reset an operation according to the program; and a delay circuit for delaying the detection signal from said voltage detecting circuit and feeding the signal to said reset signal generating means, wherein said reset signal generating means generates said reset signal on the basis of an output signal from said delay circuit, said delay circuit includes,
a first resistance connected to said power source,
a second resistance connected to a second power source
a capacitor connected to said second resistance, and
a switching circuit interposed between said first resistance and said capacitor, said reset signal generating means generates a reset signal on the basis of a charged voltage of said capacitor, and the open/closed state of said switching circuit is controlled by the detection signal of said voltage detecting circuit.

21. A microcomputer as set forth in claim 20, further comprising a capacitor connecting terminal for connecting said capacitor to an external capacitor.

22. A microcomputer as set forth in claim 20, further comprising a second logical circuit to which said reset signal and a reset signal inputted from outside are to be inputted.

23. A microcomputer as set forth in claim 20, further comprising a third logical circuit to which said detection signal and a selecting signal inputted from outside for selecting whether a voltage drop detecting function is to be operated are to be inputted, wherein the open/closed state of said switching circuit is controlled by an output signal from said third logical circuit.

24. A microcomputer as set forth in claim 20, further comprising a third logical circuit to which said detection signal and a selection signal inputted from outside for selecting whether a voltage drop detecting function is to be operated are to be inputted, wherein the open/closed state of said switching circuit is controlled by an output signal of said third logical circuit, and the output signal of said third logical circuit is inputted to said first logical circuit and said switching circuit.

25. A microcomputer as set forth in claim 20, further comprising a first latching means for latching the detection signal of said voltage detecting circuit, wherein an output signal of said latching means is rendered to be one input to said first logical circuit.

26. A microcomputer as set forth in claim 20, further comprising a second latching means for outputting a signal to indicate whether the reset signal is an active state after said detection signal is turned into the active state.

27. A microcomputer as set forth in claim 20, which is so configured that a CPU program is switched in the case where an output signal of the second latching means indicates that said detection signal is in the active state.

28. A microcomputer as set forth in claim 20, further comprising:

a capacitor connecting terminal for connecting said capacitor to another capacitor;

a latching means for latching said detection signal of the voltage detecting circuit;

a second logical circuit to which the reset signal outputted by said reset signal generating means and a reset signal inputted from outside are to be inputted; and a third logical circuit to which the detection signal of said voltage detecting circuit and a selection signal inputted from outside for selecting on the basis of the detection signal whether the programmed operation is to be stopped are to be inputted, wherein the open/closed state of said switching circuit is controlled by an output signal of said third logical circuit, an output signal of said latching means is rendered to be an input to said third logical circuit, and the output signal of said third logical circuit is rendered to be an input to said first logical circuit.

* * * * *